United States Patent [19]
Go et al.

[11] Patent Number: 5,305,355
[45] Date of Patent: Apr. 19, 1994

[54] SYSTEM FOR DATA COMMUNICATION ON AUTOMOBILE

[75] Inventors: Yasunao Go; Yoshikatsu Ikata; Toshiyuki Kimura; Hiroshi Shimotsuma, all of Kawagoe, Japan

[73] Assignee: Pioneer Electronic Corporation, Tokyo, Japan

[21] Appl. No.: 874,968

[22] Filed: Apr. 27, 1992

[30] Foreign Application Priority Data

Apr. 26, 1991 [JP] Japan .................. 3-097673
May 22, 1991 [JP] Japan .................. 3-117726
May 22, 1991 [JP] Japan .................. 3-117727

[51] Int. Cl.$^5$ .............. H04L 7/00; G05B 23/02; G05B 19/02
[52] U.S. Cl. ............. 375/107; 340/825.24; 340/825.08; 340/825.21
[58] Field of Search .......... 375/107; 370/85.1, 85.6; 340/825.06, 825.07, 825.08, 825.21, 825.2, 825.22, 825.24; 307/10.1

[56] References Cited

U.S. PATENT DOCUMENTS

| | | | |
|---|---|---|---|
| 4,584,487 | 4/1986 | Hesse et al. | 370/85.6 |
| 4,727,539 | 2/1988 | Arita et al. | 370/85.6 |
| 4,742,335 | 5/1988 | Vogt | 340/825.06 |
| 4,855,730 | 8/1989 | Venners et al. | 340/825.24 |
| 4,937,816 | 1/1990 | van Steenbrugge et al. | 370/85.6 |
| 5,001,473 | 3/1991 | Ritter et al. | 340/825.08 |
| 5,054,022 | 10/1991 | van Steenbrugge | 370/85.6 |
| 5,095,445 | 3/1992 | Sekiguchi | 340/825.06 |

Primary Examiner—Curtis Kuntz
Assistant Examiner—Duane Kobayashi
Attorney, Agent, or Firm—Dane, Dalsimer, Sullivan, Kurucz, Levy, Eisele and Richard

[57] ABSTRACT

A data communication system for use on a motor vehicle includes at least one master unit and at least one slave unit which are connected to a communication bus. When the master unit is enabled, the master controller of the master unit outputs connection request demand data to the slave unit. The slave unit has a slave controller which transmits its own connection request information to the master unit in response to the connection request demand data from the master unit. The slave controller transmits, to the master unit, first change information indicating whether the connection information stored in a first memory and connection information of the slave unit that has been transmitted to the master unit are identical to each other or not. The master controller transmits some or all of connection information stored in a second memory to slave units based on the first change information of the slave units. When the data communication system is enabled, the slave controller of each slave unit transmits its own connection request information to the master unit. In response to the connection request information, the master controller establishes a communication address of each slave unit different from those of the other slave units and transmits the established communication address to the slave unit.

25 Claims, 38 Drawing Sheets

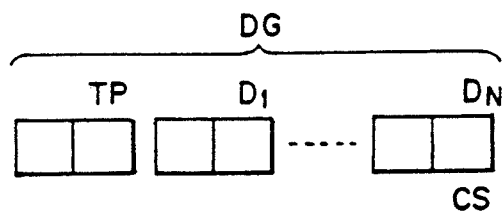

FIG. 8

| FORMAT | TP | DATA STRUCTURE | CHECK SUM |
|---|---|---|---|
| FORMAT FOR REQUESTING CONNECTION | 00 | PS LA LA ------ LA ;SLAVE→MASTER | CS |
| | 00 | PS LA -- LA PA PS LA -- LA ;MASTER→SLAVE | CS |
| FORMAT FOR KEYS, DISPLAY DATA, ETC. | 10 | PS TL LN LS LS LM | CS |
| | 20 | KEY | CS |
| | 30 | TP: CLASSIFICATION  COMMAND | CS |
| | | PS: PHYSICAL STATUS | |
| | 40 | PA: PHYSICAL ADDRESS  COMMAND | CS |
| | | LS: LOGICAL STATUS | |
| | 50 | LA: LOGICAL ADDRESS  COMMAND | CS |
| | | LM: LOGICAL MODE | |
| | 60 | TL: TALKER ADDRESS  DISPLAY | CS |
| | | LN: LISTENER ADDRESS | |
| | 70 | COMMAND | |
| | 80 | MEMORY DATA | |
| | 90 | CONTINUOUS DATA | |
| FORMAT FOR TRANSMITTING CHECK SUM RESULTS | A0 | | CS |

FIG. 9

| TP | CLASSIFI-CATION | FUNCTION·MEANING |
|---|---|---|
| 0H | CONNECTION REQUEST INFORMATION | TRANSFER OF CONNECTION REQUEST |
| 1H | STATUS INFORMATION | TRANSFER OF STATUS INFORMATION |
| 2H | KEY DATA | TRANSFER OF KEY DATA FROM SLAVE TO MASTER |
| 3H | KEY COMMAND | TRANSFER OF KEY COMMAND FROM MASTER TO SLAVE |
| 4H | SYSTEM COMMAND | TRANSFER OF COMMAND TO CONFIRM ACKNOWLEDGEMENT, OPERATION COMPLETION |
| 5H | SPECIAL COMMAND | TRANSFER OF OTHER THAN KEY COMMAND, SYSTEM COMMAND |
| 6H | DISPLAY DATA | TRANSFER OF DISPLAY DATA |
| 7H | REFRESH | MASTER CONFIRMS STATUS OF SOURCE |
| 8H | MEMORY DATA | TRANSFER CONTENTS OF MEMORY |
| 9H | CONTINUOUS DATA | CONTINUOUSLY TRANSFER CONTENTS OF MEMORY |
| AH | RETURN DATA | RETURN OF CHECK SUM RESULTS |
| BH | UNDEFINED | |
| CH | UNDEFINED | |
| DH | UNDEFINED | |
| EH | UNDEFINED | |
| FH | UNDEFINED | |

FIG. 10

| MAJOR CLASSIFI-CATION | SUB-CLASSIFI-CATION | FORMAT | MEANING |
|---|---|---|---|
| 0H | 0H | CONNECTED STATE UNCHANGED | CONNECTED STATE OF THE UNIT UNCHANGED |
| | 1H | CONNECTED STATE CHANGED | CONNECTED STATE OF THE UNIT CHANGED |
| | 2H | CONNECTION REQUEST | SLAVE UNIT REQUESTS CONFIRMATION OF CONNECTED STATE |
| | 3H | ADDRESS TRANSMISSION | MASTER UNIT TRANSMITS ESTABLISHED ADDRESS OF SLAVE UNIT |
| 2H | 0H | DEDICATED KEY CODE | SENDING OF PRODUCT KEY CODE |
| | 1H | REMOTE CONTROL CODE | SENDING OF REMOTE CONTROL DATA |
| | 2H | KEY COMMAND | SENDING OF BUS COMMAND |
| | 3H | | |
| 6H | 0H | STANDARD FORMAT | |
| | 1H | IMAGE DATA | TRANSFER OF GRAPHIC DATA IMAGE |
| | 2H | COMPRESSED DATA | TRANSFER OF COMPRESSED GRAPHIC DATA |
| | 3H | FUNCTION KEY DATA | TRANSFER OF FUNCTION KEY DISPLAY DATA |
| 8H | 0H | RAM READ | SENDING OF READ DATA OF RAM |
| | 1H | RAM WRITE | SENDING OF WRITE DATA OF RAM |
| | 2H | ROM READ | SENDIND OF READ DATA OF ROM |
| | 3H | | |
| 9H | 0H | | |
| | 1H | | |
| | | | |
| | 8H | CONTINUOUS DATA | TRANSFER OF CONTINUOUS DATA |
| AH | 0H | ——— | CHECK SUM NG |
| | 1H | ——— | CHECK SUM OK |

FIG.11

| P ADDRESS | | FUNCTION | L ADDRESS | | P ADDRESS | | FUNCTION | L ADDRESS | |
|---|---|---|---|---|---|---|---|---|---|
| 0 | 0 | MASTER AND OTHER FUNCTIONS | * | * | 1 | 0 | | | |
| 0 | 1 | DISPLAY (0) | 0 | 1 | 1 | 1 | DISPLAY (1) | 1 | 1 |
| 0 | 2 | AUDIO (0) | 0 | 2 | 1 | 2 | AUDIO (1) | 1 | 2 |
| 0 | 3 | CASSETTE TAPE DECK | 0 | 3 | 1 | 3 | | 1 | 3 |
| 0 | 4 | SINGLE CD PLAYER | 0 | 4 | 1 | 4 | | 1 | 4 |
| 0 | 5 | TV TUNER | 0 | 5 | 1 | 5 | | 1 | 5 |
| 0 | 6 | MULTIPLE CD PLAYER (0) | 0 | 6 | 1 | 6 | MULTIPLE CD PLAYER (1) | 1 | 6 |
| 0 | 7 | FM/AM TUNER | 0 | 7 | 1 | 7 | | 1 | 7 |
| 0 | 8 | DAT | 0 | 8 | 1 | 8 | | 1 | 8 |
| 0 | 9 | EXTERNAL COMMANDER | 0 | 9 | 1 | 9 | | 1 | 9 |
| 0 | A | NAVIGATION SYSTEM | 0 | A | 1 | A | | 1 | A |
| 0 | B | | 0 | B | 1 | B | | 1 | B |
| 0 | C | RDS | 0 | C | 1 | C | | 1 | C |
| 0 | D | CD-ROM DECODER | 0 | D | 1 | D | | 1 | D |
| 0 | E | | 0 | E | 1 | E | | 1 | E |
| 0 | F | | 0 | F | 1 | F | | 1 | F |

FIG.12

| P ADDRESS | | FUNCTION | L ADDRESS | |
|---|---|---|---|---|
| 2 | 0 | | | |
| | | | | |
| 2 | 1 | CASSETTE TAPE DECK | 0 | 3 |
| | | AM/FM TUNER | 0 | 7 |
| 2 | 2 | SINGLE CD PLAYER | 0 | 4 |
| | | AM/FM TUNER | 0 | 7 |
| 2 | 3 | TV TUNER | 0 | 5 |
| | | FM/AM TUNER | 0 | 7 |
| 2 | 4 | DISPLAY | 0 | 1 |
| | | EXTERNAL COMMANDER (KEY) | 0 | 9 |
| 2 | 5 | | | |
| | | | | |
| 2 | 6 | | | |
| | | | | |
| 2 | 7 | | | |
| | | | | |
| 2 | 8 | | | |
| | | | | |

FIG. 13

| ADDRESS | | FUNCTION | ADDRESS | | FUNCTION |
|---|---|---|---|---|---|
| 0 | 0 | MASTER (SOURCE SWITCHING, CONNECTION) | 1 | 0 | |
| 0 | 1 | DISPLAY (0) | 1 | 1 | |
| 0 | 2 | AUDIO (0) | 1 | 2 | AUDIO (1) |
| 0 | 3 | CASSETTE TAPE DECK | 1 | 3 | |
| 0 | 4 | SINGLE CD PLAYER | 1 | 4 | |
| 0 | 5 | TV TUNER | 1 | 5 | |
| 0 | 6 | MULTIPLE CD PLAYER (0) | 1 | 6 | MULTIPLE CD PLAYER (1) |
| 0 | 7 | FM/AM TUNER | 1 | 7 | |
| 0 | 8 | DAT | 1 | 8 | |
| 0 | 9 | EXTERNAL COMMANDER (WIRED REMOTE CONTROL) | 1 | 9 | |
| 0 | A | NAVIGATION SYSTEM | 1 | A | |
| 0 | B | | 1 | B | |
| 0 | C | RDS | 1 | C | |
| 0 | D | CD-ROM DECODER | 1 | D | |
| 0 | E | | 1 | E | |
| 0 | F | | 1 | F | |

F I G. 18
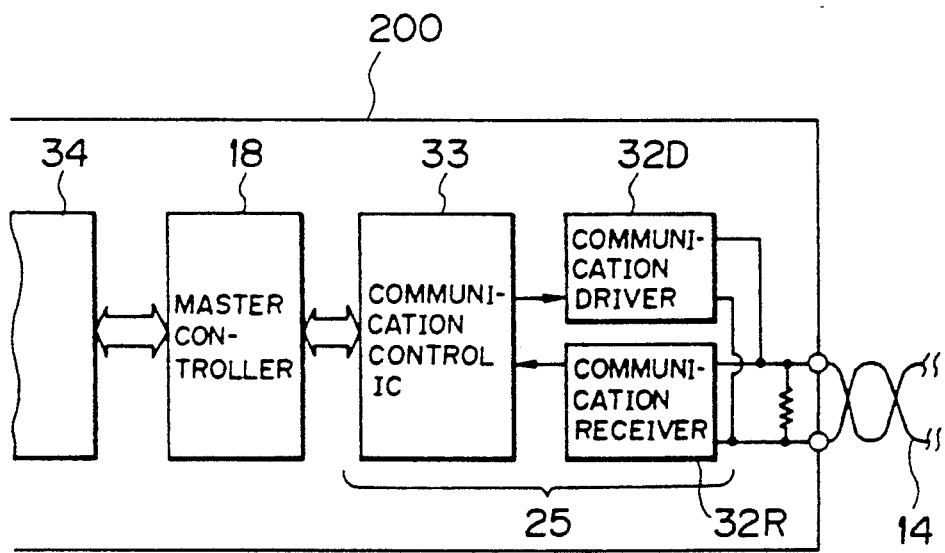

F I G. 28
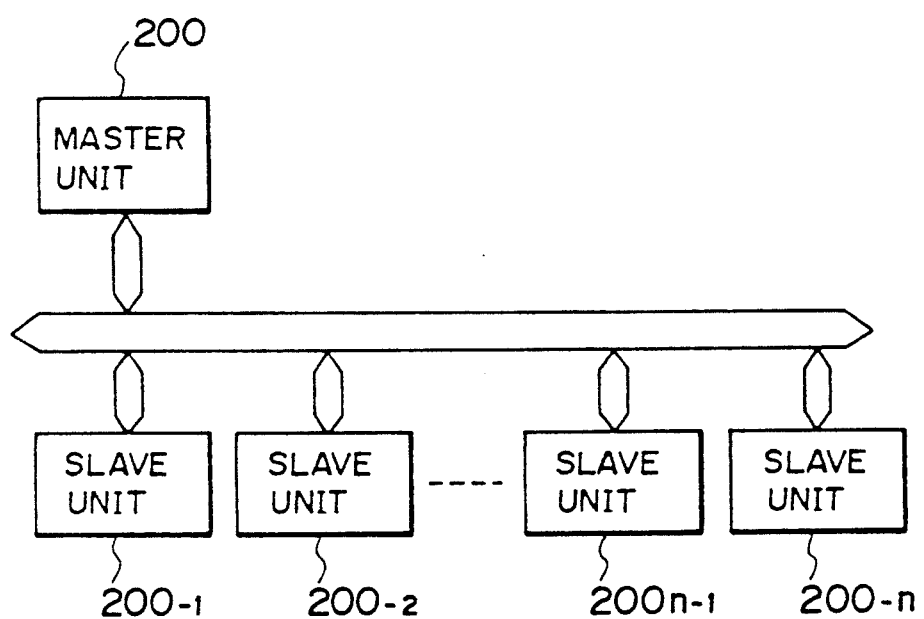

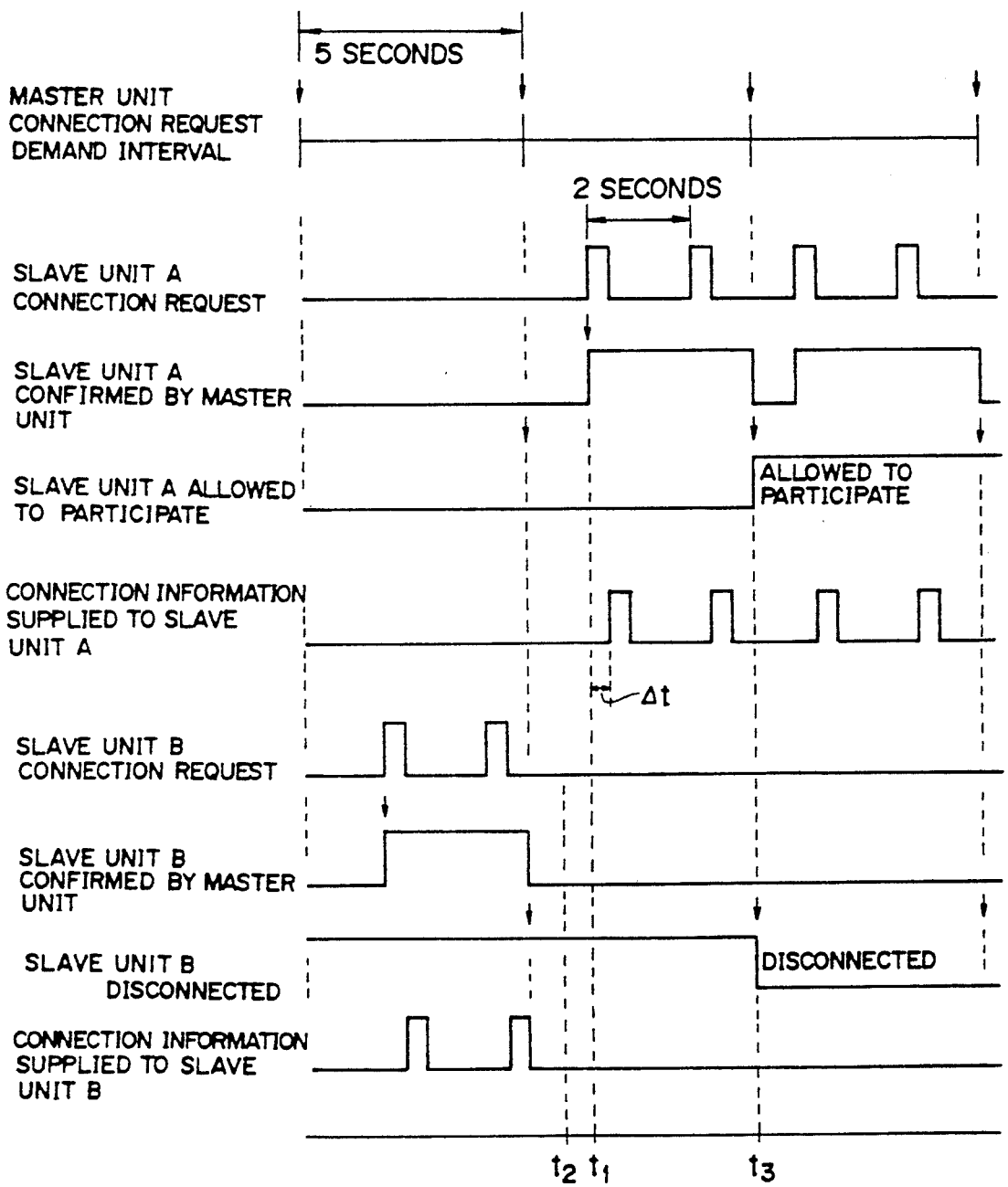

SYSTEM FOR DATA COMMUNICATION ON AUTOMOBILE

BACKGROUND OF THE INVENTION

1. Field of the Invention

The present invention relates to a data communication system, and more particularly to a data communication system suitable for use in a network of components of an audiovisual system on an automobile.

2. Description of the Prior Art

In recent years, automobile audio systems have been changing from systems which give the user only audio information such as music to systems which allow the user to enjoy both audio and visual information. Systems with both audio and visual capabilities are known as audiovisual systems.

Automobile audiovisual systems on automobiles are composed of many different audio and visual components. The audio components include a cassette tape deck, a radio tuner, a CD (compact disc) player, etc., while the visual components include a TV (television) tuner, a navigation system, etc.. Audio signals produced by some of these components are amplified by an amplifier and reproduced from loudspeakers in the automobile. Video signals produced by other components are displayed on a display unit in the automobile. Today, the audiovisual system components are controlled according to digital technology, i.e., by respective controllers in the form of microcomputers.

The components of an audiovisual system are required to be controlled systematically for systematic operation of the components. To meet this requirement, the controllers of the respective components are connected by a communication bus network, so that control data for the components will be transmitted through the communication bus.

For the convenience of description, either one of the components connected to the communication bus is referred to as a "master unit" for controlling the overall network, while each of the other components is referred to as a "slave unit".

When the master unit transmits communication data to a slave unit for access or the slave unit transmits data back to the master unit, it is necessary that the controllers be identified or specified. For this purpose, the controllers are allotted respective addresses indicating themselves.

In order for the master unit to access the slave units, the master unit has to have the addresses of all the slave units registered in itself. The master unit cannot access any slave unit whose address has not been registered by the master unit. Therefore, any such slave unit may not function even if it is physically or electrically connected to the communication bus.

To avoid the above situation, when a request for registration in the system (hereinafter also referred to as a "connection request" is sent from a slave unit to the master unit, the master unit issues, to the slave unit, the connection information of all the other slave units and the master unit which are connected to the communication bus. Since the connection information varies depending on the operating condition of each of the slave units, each slave unit transmits information for a connection request (hereinafter also referred to as "connection request information") to the master unit in each time period. Having received the connection information from the slave units, the master unit transmits the connection information of all the slave units and the connection information of its own to the slave units.

If there is no response from the master unit to the connection information transmitted from the slave units, the slave controller of each of the slave units determines that the master unit has failed to operate or has been disabled, and enters a low power consumption mode, and stands by in that mode. Thereafter, each slave unit sends a connection request to the master unit in each fixed time period (e.g., of 2 seconds) under the control of a timer in its own slave controller, and enters a normal mode if a response is received from the master unit.

FIG. 39 of the accompanying drawings is a timing chart of connection requests from slave units of a conventional automobile audiovisual system.

It is assumed in FIG. 39 that initially, the master unit is disabled due to a temporary voltage drop, for example, or the user presses a reset switch upon a malfunction of the system at a time $t_0$. The master unit fails to respond to a connection request $R_{NA}$ from a slave unit A at a time $t_2$ and a connection request $R_{NB}$ from a slave unit B at a time $t_1$. Thereafter, the slave units A, B enter a low power consumption mode. Then, the slave units A, B temporarily enter a normal mode and send respective connection requests $R_{NA}$, $R_{NB}$ to the master unit in each fixed time period (e.g., of 2 seconds) under the control of timers in their own slave controllers. If no response comes back from the master unit, the slave units A, B enter the low power consumption mode again.

When the master unit is subsequently enabled at a time $t_3$, its master controller waits for connection requests from the slave units A, B for a wait time period (e.g., of 1 second) from the time $t_3$ to a time $t_4$. Since the slave controllers of the slave units A, B send connection requests $R_{NA}$, $R_{NB}$ every 2 seconds, only the slave controller of the slave unit B can successfully request a connection during the wait time period from the time $t_3$ to the time $t_4$. Consequently, the slave unit A is unable to enter the normal mode until it sends a next connection request $R_{NA}$ at a time $t_5$.

With the communication bus of the conventional automobile audiovisual system, therefore, even when the master unit is activated again from a disabled state, some of the slave units may be delayed in resuming their normal operation because the slave units issue connection requests at different times, as described above. The delayed operation of some slave units may be inconvenient for the user of the automobile audiovisual system.

One solution would be to increase the wait time period for the master unit to wait for connection confirmation requests after the master unit is enabled. However, inasmuch as the period of time required for the entire automobile audiovisual system to be enabled would also be increased, the automobile audiovisual system might also be inconvenient for the user.

FIG. 40 of the accompanying drawings is a timing chart of an exchange of connection requests and connection information between master and slave units connected through a communication bus of another conventional automobile audiovisual system.

When a slave unit A sends a connection request at a time $t_1$, the master unit transmits the connection information of its own and of all slave units controlled by the master unit to the slave unit A a time period $\Delta t$ after the time $t_1$. Subsequently, the slave unit A sends a connection request in each time period (e.g., of 2 seconds), and the master unit transmits the above connection information to the slave unit A in response to each such connection request.

Concurrent with this, the master unit determines whether there have been connection requests from all the slave units within a certain time period (e.g., of 5 seconds), for thereby checking the number and types of the connected slave units to confirm any slave units that have been disconnected or dropped from service or that have been newly added. For example, if a slave unit B which has been connected so far is disconnected or dropped from service at a time $t_2$, then the master unit receives no connection request from the slave unit B at a time $t_3$, when the master unit confirms the number of connected slave units. Thereafter, the master unit regards the slave unit B as being disconnected, and subsequently transmits the connection information of its own and of all the slave units except the slave unit B. Conversely, when the slave unit A is newly connected and requests a connection at the time $t_1$, the master unit determines that the slave unit A has not requested a connection so far, and subsequently transmits the connection information of its own and of all the slave units including the slave unit A.

However, the other conventional automobile audiovisual system is required to effect a frequent exchange of data for establishing a connection between the master and slave units. Since the communication bus is occupied for a long period of time by the exchange of the data for establishing a connection, the audiovisual data cannot efficiently be transmitted in the automobile audiovisual system.

In the conventional automobile audiovisual systems, the controllers of the master and slave units are allotted respective communication addresses of their own. Consequently, in the case where a plurality of slave units, such as CD players, having identical slave controllers and designed to perform identical functions, when the user tries to operate on one of the CD players, both of the CD players would be caused to operate in an identical fashion. To avoid such a shortcoming, the user is required to change the setting of a switch, such as a DIP switch, which is mounted on each slave unit for setting a communication address, to assign a different communication address to one of the CD players. However, the manual address setting procedure is time-consuming and is not reliable for setting a proper communication address.

SUMMARY OF THE INVENTION

It is an object of the present invention to provide a data communication system for use on an automobile, which can be enabled again immediately after a master unit is restored from a temporary failure or disabled state.

Another object of the present invention it to provide a data communication system for use on an automobile, which is able to make necessary connection requests and also to effect data communication efficiently.

Still another object of the present invention is to provide a data communication system for use on an automobile, which allows communication addresses to be established easily and reliably even when a plurality of slave units having identical slave controllers are connected to a communication bus, thus permitting a communication bus network to be set up with ease.

According to an embodiment of the present invention, there is provided a data communication system for use on a motor vehicle, comprising a communication bus, at least one master unit connected to the communication bus, and at least one slave unit connected to the communication bus, the master unit having a connection request demand unit for outputting connection request demand data to the slave unit when the master unit is enabled, the slave unit having a connection request unit for transmitting its own connection request information to the master unit in response to the connection request demand data from the master unit.

The connection request unit may transmit the connection request information in each predetermined time period to the master unit. The slave unit may comprise an operation mode changing unit for controlling the slave unit to enter a low power consumption mode in the absence of a response from the master unit to the connection request information transmitted in each predetermined time period to the master unit. The operation mode changing unit may control the slave unit to enter a normal operation mode in the presence of a response from the master unit to the connection request information transmitted in each predetermined time period to the master unit. The operation mode changing unit may control the slave unit to enter a stop mode in the absence of a response from the master unit to the connection request information transmitted in each predetermined time period to the master unit.

The slave unit may comprise an operation mode changing unit for controlling the slave unit to enter a stop mode in the absence of a response from the master unit to the connection request information transmitted in each predetermined time period to the master unit. The operation mode changing unit may control the slave unit to enter a normal operation mode in the presence of a response from the master unit to the connection request information transmitted in each predetermined time period to the master unit.

The slave unit may comprise an interface connected to the communication bus for transmitting communication data to and receiving communication data from the master unit, and a controller for controlling the slave unit, the controller including a unit for energizing the interface and halting the controller in the low power consumption mode. The interface may include a data receiver for receiving communication data, the controller including a unit for energizing only the data receiver in the low power consumption mode.

The slave unit may comprise an interface connected to the communication bus for transmitting communication data to and receiving communication data from the master unit, and a controller for controlling the slave unit, the controller including a unit for energizing the interface and stopping the controller in the stop mode. The interface includes a data receiver for receiving communication data, the controller including a unit for energizing only the data receiver in the stop mode.

When the master unit is enabled, the connection request demand unit outputs connection request demand data to the slave unit. In response to the connection request demand data, the connection request unit of the slave unit transmits its own connection request information to the master unit. Therefore, the master unit can receive the connection request information of all slave unit controlled thereby at desired times. When the master unit is disabled due to a failure and then restored from the disabled condition, it can easily enable the data communication system within a short period of time.

According to another embodiment of the present invention, there is also provided a data communication system for use on a motor vehicle, comprising a communication bus, at least one master unit connected to the communication bus, and a plurality of slave units connected to the communication bus, each of the slave units comprising a first memory for storing connection information thereof, and a first connection information transmitter for transmitting, to the master unit, first change information indicating whether the connection information stored in the first memory and connection information of the slave unit that has been transmitted to the master unit are identical to each other or not, the master unit comprising a second memory for storing connection information thereof, and a second connection information transmitter for transmitting the connection information stored in the second memory to the slave unit based on the first change information of each of the slave units.

The first connection information transmitter may transmit the first change information and the connection information stored in the first memory to the master unit if the connection information of the slave unit and the connection information thereof that has previously been transmitted to the master unit are not identical to each other. The second connection information transmitter may transmit, to the slave units, the second change information indicating whether the connection information stored in the second memory and connection information that has been transmitted to the slave units are identical to each other or not. The master unit may further comprises a unit for transmitting, to the slave units, at least one of the connection information stored in the second memory and connection information of the slave units which are connected to the communication bus.

The second connection information transmitter may transmit the connection information stored in the second memory to the slave units when the number or types of the slave units connected to the communication bus are changed.

The second connection information transmitter may transmit at least the second change information, of the connection information and the second change information, simultaneously to the slave units connected to the communication bus.

The second connection information transmitter may transmit at least the second change information, of the connection information and the second change information, to a group of the slave units connected to the communication bus.

The first connection information transmitter may transmit at least the first change information in each predetermined time period.

The second connection information transmitter may transmit at least the second change information in each predetermined time period.

The first connection information transmitter of each of the slave units transmits, to the master unit, first change information indicating whether the connection information stored in the first memory and connection information of the slave unit that has been transmitted to the master unit are identical to each other or not. The second connection information transmitter transmits some or all of the connection information stored in the second memory to the slave units based on the first change information of each of the slave units. The master and slave units can therefore recognize the latest connected state based on the latest connection information. The time in which the communication bus is occupied by the transmission of connection information is relatively short, allowing system data to be transmitted efficiently.

According to still another embodiment of the present invention, there is further provided a data communication system for use on a motor vehicle, comprising a communication bus, at least one master unit connected to the communication bus, and a plurality of slave units connected to the communication bus, each of the slave units comprising a memory for storing a communication address thereof updatably, and a connection request unit for transmitting connection request information thereof to the master unit when the data communication system starts to operate, the master unit comprising a communication address setting unit for establishing a communication address of each of the slave units different from those of the other slave units and transmitting the established communication address to the slave unit when the connection request information is received.

The memory of each of the slave units may store a temporary communication address before the data communication system starts to operate.

The memory of each of the slave units may store a common temporary communication address for a group of slave units of the slave units connected to the communication bus.

The communication address setting unit may establish the communication address based on the temporary communication address.

The communication address setting unit establishes communication addresses of the respective slave units different from each other based on the fact that the master unit receives the connection request information from the slave units at different times because the power supplies of the slave units are turned on at different times. Even if a plurality of slave units having the same function are connected to the communication bus, these slave units can be allotted respective communication addresses quickly and reliably. Consequently, the data communication system can easily be set up for service.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a diagram of basic data formats; FIG. 9 is a diagram of major classification data; FIG. 10 is a diagram of subclassification data; FIG. 11 is a diagram showing physical addresses; FIG. 12 is a diagram showing physical addresses; FIG. 13 is a diagram showing logical addresses; FIG. 18 is a block diagram of still another specific arrangement of the data communication system according to the first embodiment.

FIG. 28 is a block diagram of a connected arrangement of the data communication system according to the second embodiment;

FIG. 40 is a timing chart of an exchange of requests and connection information between the master and slave units connected of another conventional automobile audiovisual system.

DETAILED DESCRIPTION OF THE PREFERRED EMBODIMENTS

[1] First Embodiment
GENERAL ARRANGEMENT OF DATA COMMUNICATION SYSTEM

Figure 1:
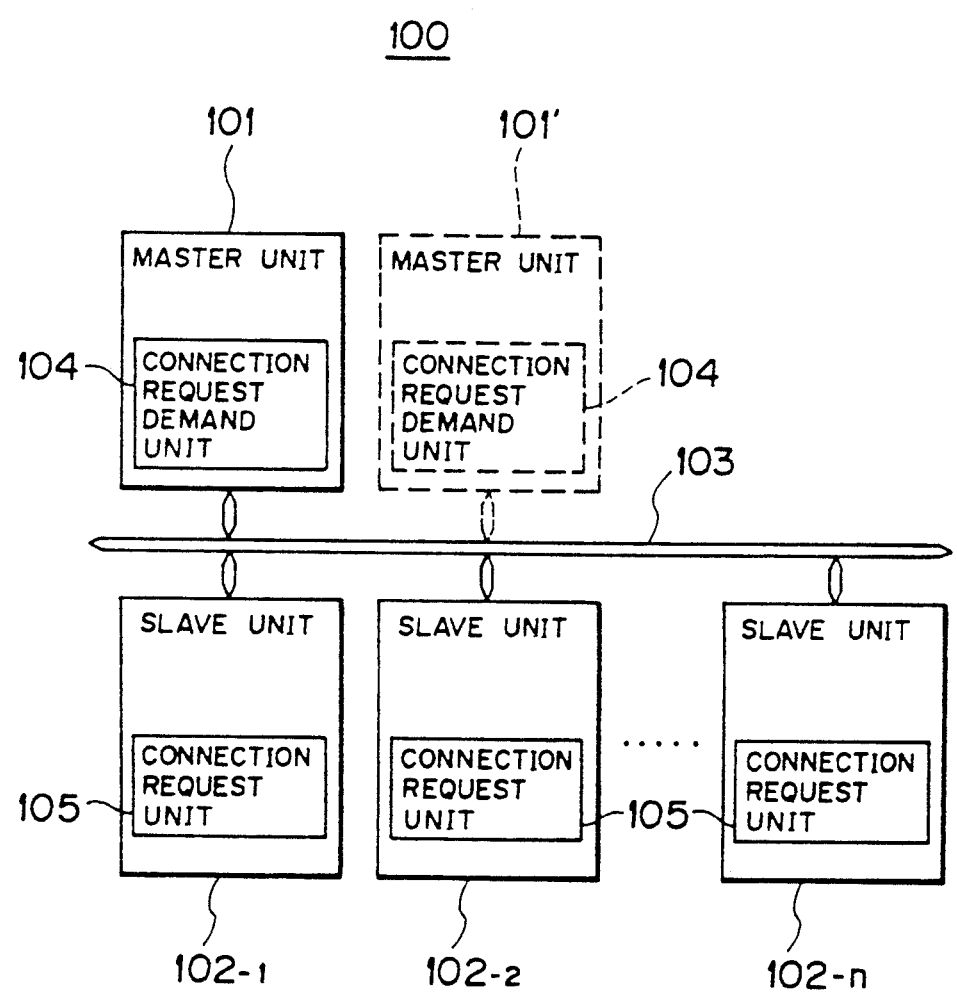
FIG. 1 is a block diagram of a data communication system according to a first embodiment of the present invention.

FIG. 1 schematically shows in block form a data communication system for use on an automobile according to a first embodiment of the present invention.

The data communication system, generally designated by the reference numeral 100, comprises at least one master unit 101 (101') connected to a communication bus 103 and a plurality of slave units $102_{-1}$, $102_{-2}$, $\sim 102_{-n}$ connected to the communication bus 103. The master unit 101 (101') has a connection request demand unit 104 for transmitting connection request demand data D to the slave units $102_{-1} \sim 102_{-n}$ when the master unit 101 (101') is enabled. The slave units $102_{-1} \sim 102_{-n}$ have respective connection request units 105 for transmitting their own connection request information to the master unit 101 (101') in response to the reception of the connection request demand data D.

When the master unit 101 (101') is enabled, the connection request demand unit 104 issues connection request demand data D to the slave units $102_{-1} \sim 102_{-n}$.

When the slave units $102_{-1} \sim 102_{-n}$ receive the connection request demand data D, the connection request units 105 transmit their own connection request information to the master unit 101 (101').

The master unit 101 (101') can receive the connection request information from the slave units $102_{-1} \sim 102_{-n}$ at any desired time for easily enabling the entire data communication system.

POWER SUPPLY OF AUDIOVISUAL SYSTEM

Figure 2:
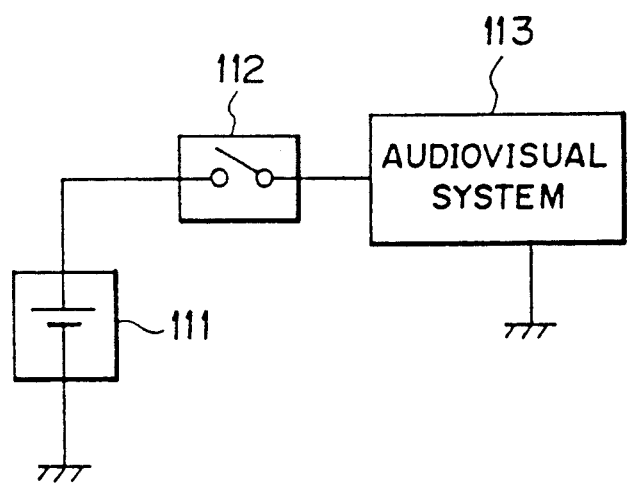
FIG. 2 is a block diagram of a power supply circuit for an audiovisual system as the data communication system according to the first embodiment.

The principles of the present invention are particularly useful when embodied in an audiovisual (AV) system on an automobile as the data communication system. As shown in FIG. 2, the audiovisual system, denoted at 113, is supplied with electric energy from a battery 111 through an ACC switch 112. The ACC switch 112 is ganged with an engine start keyswitch of the automobile. When the engine key inserted in the engine start keyswitch is turned to the position of the ACC switch, the accessories on the automobile are energized by the battery 111. At the same time, the audiovisual system 113 is also energized by the battery 111.

ARRANGEMENT OF AUDIOVISUAL SYSTEM

Figure 3:
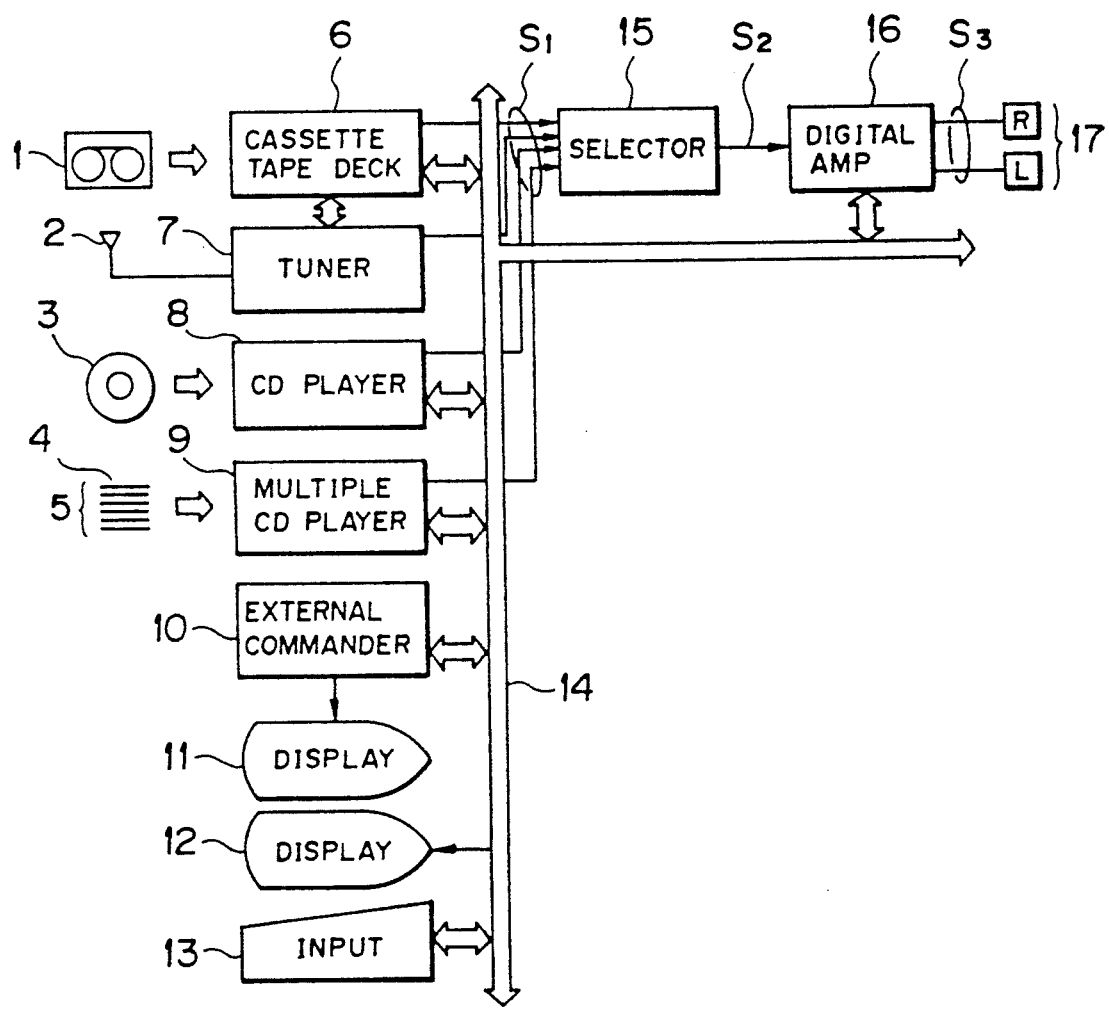
FIG. 3 is a block diagram of the audiovisual system.

FIG. 3 shows a detailed systematic arrangement of the audiovisual system. The audiovisual system has audio reproducing components and visual reproducing components. The audio reproducing components include a cassette tape deck 6 for reproducing recorded audio signals from a cassette tape 1, a tuner 7 such as an AM/FM tuner for reproducing radio signals which are received by an antenna 2, a CD player 8 for reproducing recorded signals from a CD 3, and a multiple CD player 9 having an automatic CD changer 5 for reproducing recorded signals from multiple CDs 4. The visual reproducing components include a TV tuner contained in the tuner 7, for reproducing TV signals received by the antenna 2, and a display unit 12 for displaying images based on the TV signals and also displaying still images based on signals from the CD player 8 if a CD-ROM is played back by the CD player 8. Typically, a CD-ROM is employed by a navigation system. The audiovisual system has an external commander 10 which is in the form of a keyboard for entering various operation commands. A display unit 11 is connected to the external commander 10. The audiovisual system also has an input unit 13, which may be incorporated in the external commander 10.

The above components of the audiovisual system have respective controllers for controlling their own operation. These controllers are connected to each other through a communication bus 14, thereby making up a communication bus control network. The control network is shown in FIG. 4, and will be described in detail later on.

Reproduced signals $S_1$ from the audio reproducing components are selectively applied through a selector 15 as a reproduced signal $S_2$ to a digital amplifier 16. After the reproduced signal $S_2$ has been amplified by the digital amplifier 16, it is applied as reproduced signals $S_3$ to loudspeakers 17 from which the reproduced sounds $S_3$ are outputted. The digital amplifier 16 contains a digital signal processing circuit which is controlled by a controller in the digital amplifier 16, the controller being connected to the communication bus 14.

CONTROL NETWORK OF AUDIOVISUAL SYSTEM

Figure 4:
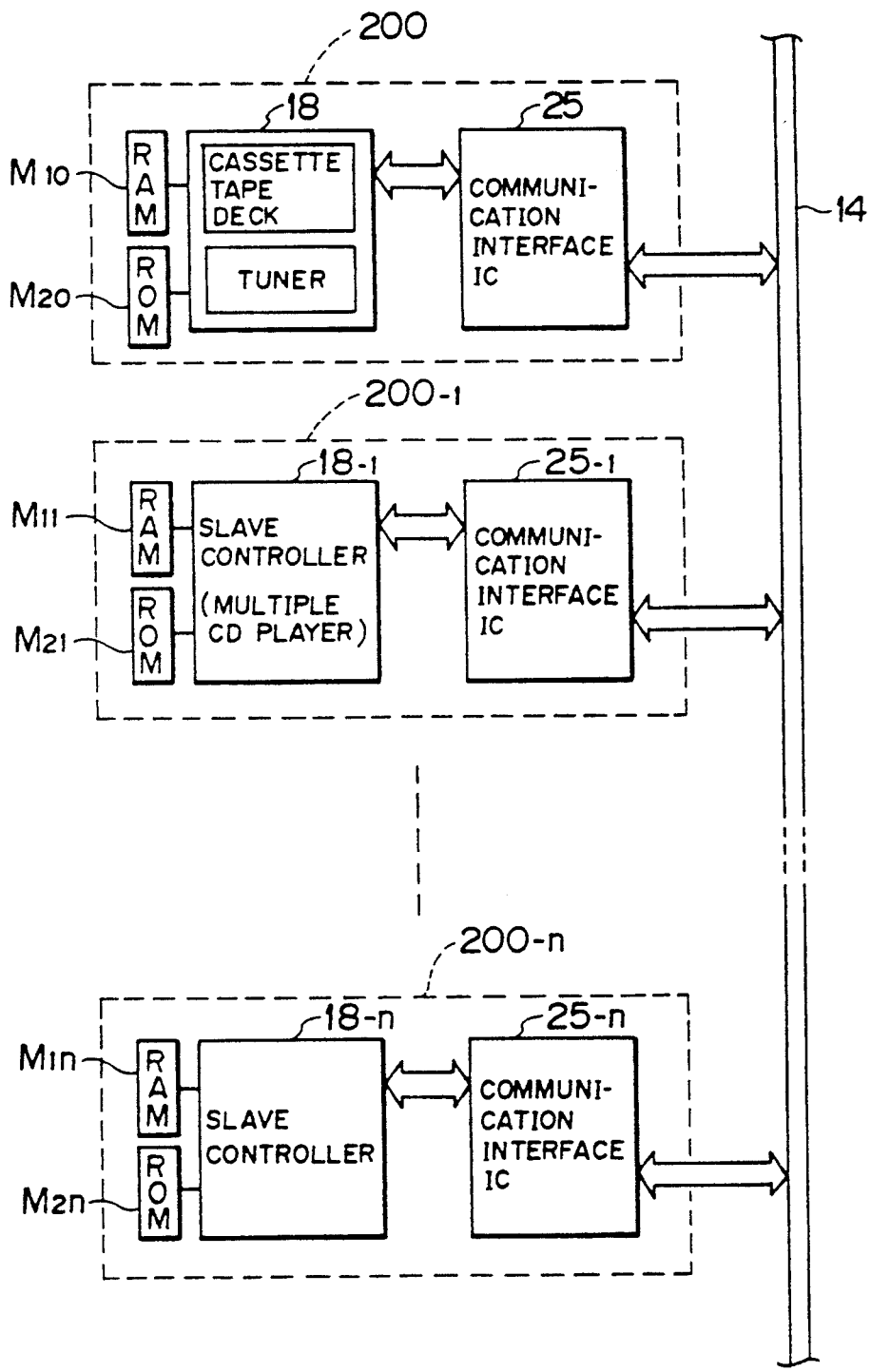
FIG. 4 is a block diagram of a control network of the audiovisual system.

FIG. 4 shows the control network in detail. For the purpose of description, the audiovisual system components connected to the communication bus 14 as shown in FIG. 3 will hereinafter be referred to as "units." As shown in FIG. 4, these units are connected to the communication bus 14 parallel to each other. Either one of these units is selected as a "master" unit, indicated by 200, for controlling the control network, while the other units serve as "slave" units, indicated by $200_{-1} \sim 200_{-n}$.

The master unit 200 has a master controller 18 connected through a communication interface IC 25 to the communication bus 14. The master controller 18 functions as controllers for controlling the cassette tape deck 6 and the tuner 7 The slave units $200_{-1} \sim 200_{-n}$ have respective slave controllers $18_{-1} \sim 18_{-n}$ which are also connected to the communication bus 14 through respective communication interface ICs $25_{-1} \sim 25_{-n}$ RAMs $M_{10} \sim M_{1n}$ are connected respectively to the slave controllers $18_{-1} \sim 18_{-n}$, and ROMs $M_{20} \sim M_{2n}$ are also connected respectively to the slave controllers $18_{-1} \sim 18_{-n}$.

Figure 5:
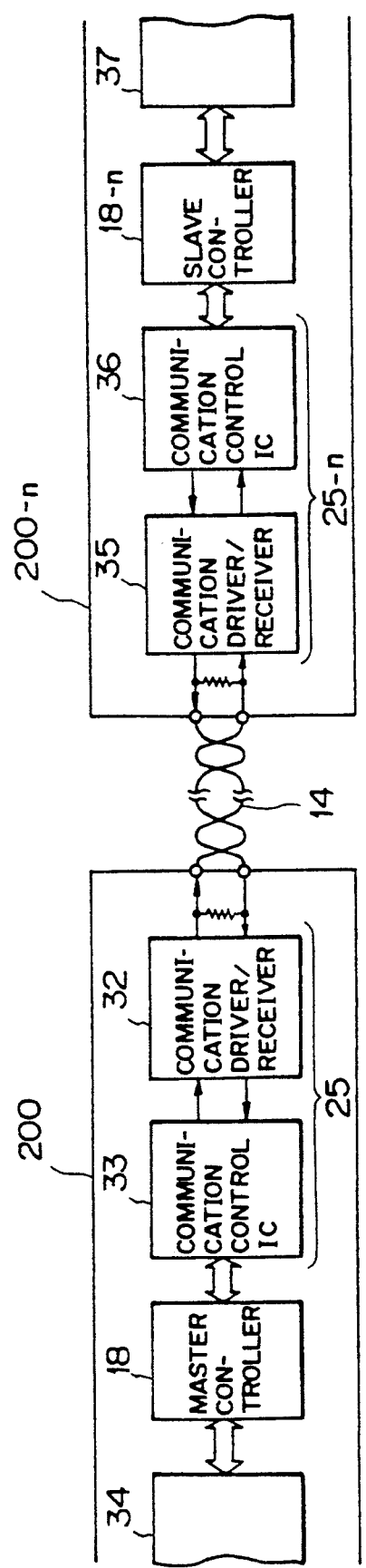
FIG. 5 is a block diagram of a specific arrangement in which a master unit and a slave unit are connected to each other.

FIG. 5 shows a specific arrangement in which the master unit 200 and the slave unit $200_{-n}$ are connected to each other. The master unit 200 and the slave unit $200_{-n}$ are connected to each other by the communication bus 14. The communication bus 14 comprises a twisted pair of conductors or wires. Communication data DT transferred through the communication bus 14 is transmitted and received by the communication interface ICs 25, $25_{-n}$ of the master unit 200 and the slave unit $200_{-n}$, respectively. The communication interface IC 25 is divided into a communication driver/receiver 32 and a communication control IC 33. Likewise, the communication interface IC $25_{-n}$ is divided into a communication driver/receiver 35 and a communication control IC 36. Heretofore, the communication driver/receiver and the communication control IC have been integrally combined in one IC. The communication control IC 33 is composed of a CMOS transistor, while the communication driver/receiver 32 is composed of a bipolar transistor of high current-driven capability. The communication driver/receiver 35 and the communication control IC 36 are of the same structures as the communication driver/receiver 32 and the communication control IC 33.

Figure 6:
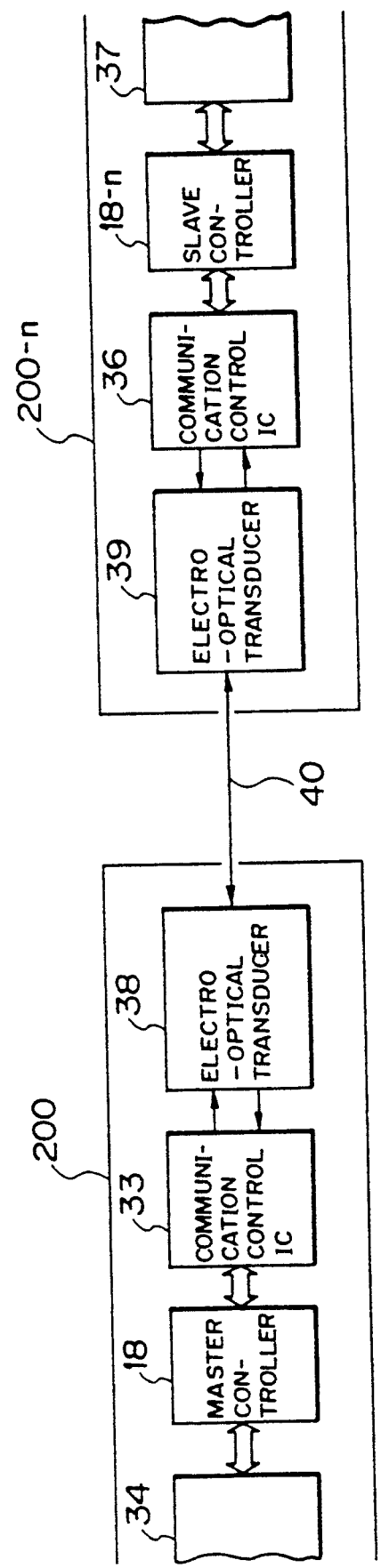
FIG. 6 is a block diagram of another specific arrangement in which a master unit and a slave unit are connected to each other.

The communication interface IC 25, for example, which is divided into the communication control IC 33 and the communication driver/receiver 32, is capable of coping with different transmission mediums for the communication bus 14. In FIG. 5, the communication bus 14 is composed of a twisted pair of conductors or wires for differential transmission. If the communication bus 14 comprises an optical communication cable 40 as shown in FIG. 6, then the communication driver/receiver 32 shown in FIG. 5 may be replaced with an electro-optical transducer 38 with the communication control IC 33 remaining unchanged. Another advantage is that since the master unit 200 fails due primarily to disturbance noise entering from the communication bus 14, only the communication driver/receiver 32 will malfunction when an excessive signal is applied thereto from the communication bus 14, and replacing the malfunctioning communication driver/receiver 32 with a new one will restore the master unit 200. Consequently, the maintenance of the master unit 200 and also the slave unit $200_{-n}$ is relatively easily carried out. The easy maintenance is particularly advantageous with audiovisual systems on automobiles because the master and slave units are exposed to and tend to be damaged by noise induced by the automobile engines.

Furthermore, the fabrication of bipolar transistors and CMOS transistors according to different processes is easier and less expensive than the fabrication of Bi-CMOS ICs.

While only the communication interface IC 25 has been described above, each of the communication interfaces $25_{-1} \sim 25_{-n}$ of the other slave units $200_{-1} \sim 200_{-n}$ is also divided into a communication control IC and a communication driver/receiver.

TRANSMISSION FORMAT OF COMMUNICATION DATA DT

Figure 7:
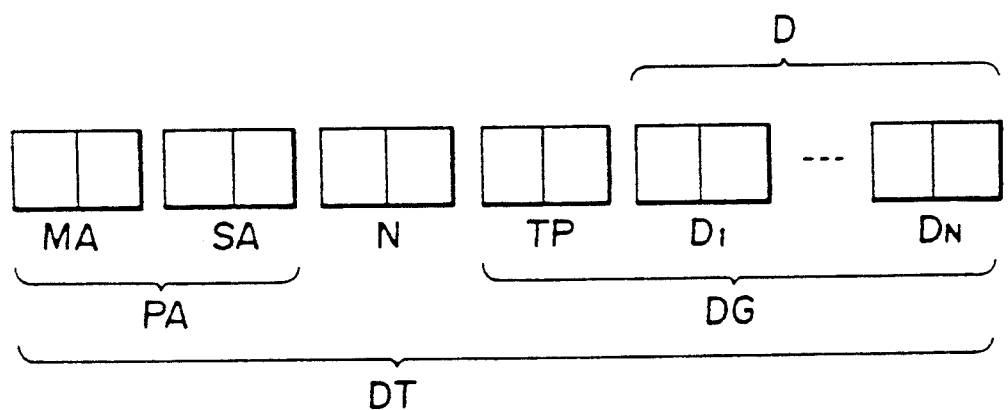
FIG. 7 is a diagram of a transfer format of communication data.

FIG. 7 shows a transfer format of the communication data DT. As shown in FIG. 7, the communication data DT comprises, from its leading end, master address data MA indicating the address of the master unit 200, slave address data SA indicating the addresses of the slave units $200_{-1} \sim 200_{-n}$, message length data N indicating the message length of data D, classification data TP indicating the type of the data D, and the data D itself which represents the contents to be transferred. The master address data MA and the slave address data SA form a physical address data, and the data D and the classification data TP form a data group.

The arrangement of the data D varies depending on the contents of the communication data DT, i.e., the classification data TP. There are roughly three formats for the data D. As shown in FIG. 8, the first format is a format for confirming a connection, the second format is a format for keys and display data, and the third format is a format for transmitting the result of a check sum CS. In the format for keys and display data as shown in FIG. 8, data ranging from physical status data PS to logical mode data LM are all identical, and omitted from illustration.

The classification data TP is positioned at the leading end of the data group DG, and serves as a data area indicating the type of the data D following the classification data TP. The classification data TP is composed of major classification data and subclassification data. As shown in FIG. 9, the major classification data represents the type of the data D. If the entire classification data TP is of 8 bits, then the major classification data is allotted four high-order bits. As shown in FIG. 10, the subclassification data is mainly used to identify the format of the data D, and is allotted four low-order bits. For example, if the classification data TP is TP="21H", then the four high-order bits are "2H" and mean that key data are to be transferred from the slave unit to the master unit, and the four low-order bits are "1H" and mean that the key data to be transferred is remote control data.

Figure 14:
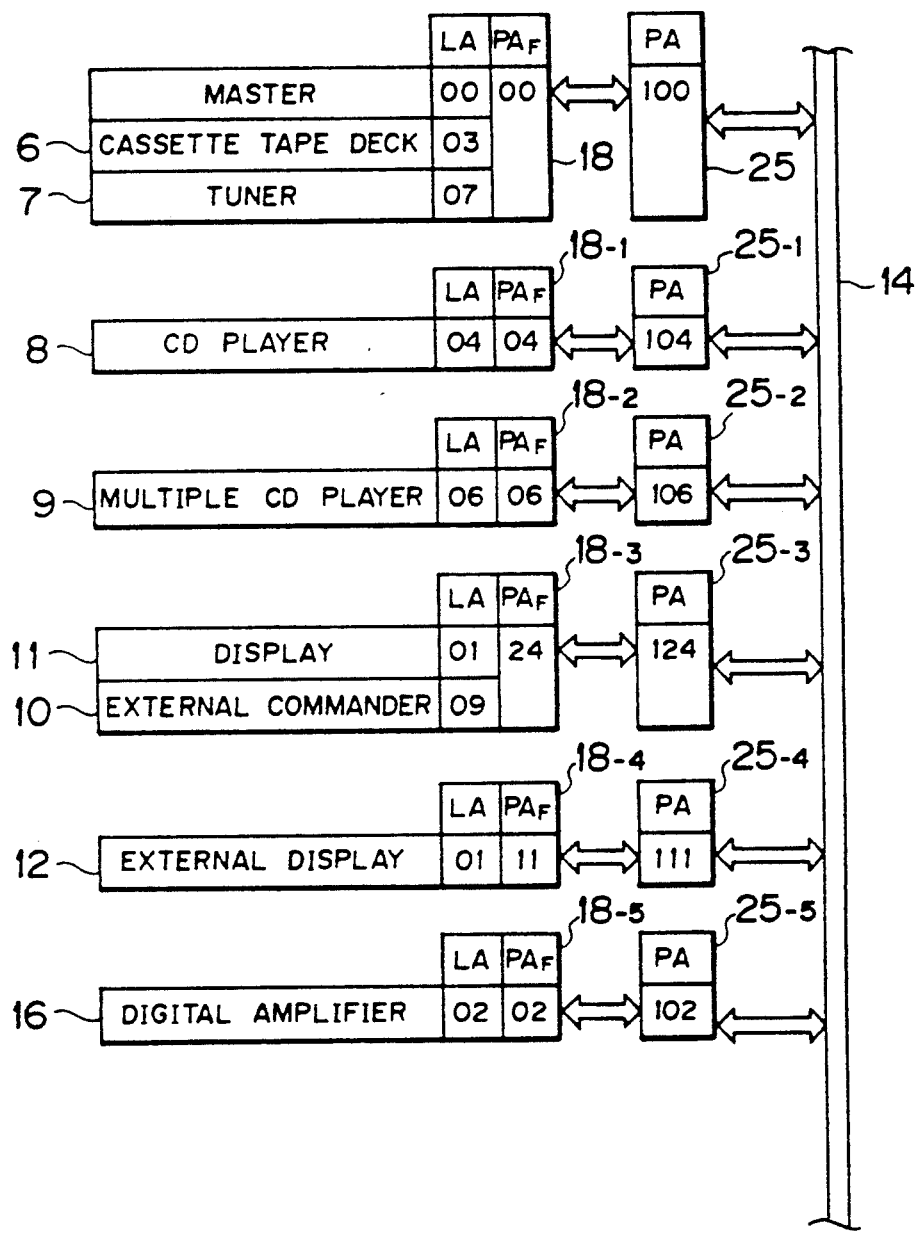
FIG. 14 is a diagram illustrative of an example in which physical and logical addresses are assigned.

As illustrated in FIGS. 11 and 12, the physical address data PA represents communication addresses for specifying the communication interface ICs $25_{-1} \sim 25_{-n}$ of the master unit 200 and the slave units $200_{-1} \sim 200_{-n}$ on the communication bus 14, the addresses indicating the master unit 200 and the slave units $200_{-1} \sim 200_{-n}$. The physical address data PA for specifying the master unit 200 is fixed at all times. Basically, one unit is allotted one physical address data PA is allotted to one unit. FIG. 14 shows an example in which the units shown in FIG. 3 are allotted physical address data PA. In FIG. 14, the physical address data PA are established for the master and slave controllers 18 $\sim 18_{-5}$. This is to take into account the fact that two functional elements, such as the cassette tape deck 6 and the tuner 7, are connected to one master controller 18, as with the master unit 200. If one controller is combined with one function, then the physical address data PA and the logical address data LA indicate the same address, as with the slave controllers $18_{-1}$, $18_{-2}$, $18_{-5}$.

The physical status data PS represents status information about the master unit 200 and the slave units $200_1 \sim 200_n$, and is data indicative of the number of function addresses (i.e., the logical address data LA, described below) that the units have.

As shown in FIG. 13, the logical address data LA is data indicative of each of the functions (e.g., the tuner and the cassette tape deck) possessed by the master unit 200 and the slave units $200_1 \sim 200_{-n}$. The logical address data LA is assigned to each function. The number of logical address data LA is not fixed because there are as many logical address data LA (e.g., $LA_1$, $LA_2$, ...) as there are functions possessed by the controller that is determined by the physical address data PA. FIG. 14 also shows the logical address data LA assigned to the units shown in FIG. 3.

The talker address data TL indicates the address of a transmitting side (talker) which transmits the communication data DT. The listener address data LN indicates the address of a receiving side (listener) which receives the communication data DT. The logical status data LS represents the status of the function corresponding to each logical address LA. The logical mode data LM represents the operation status (mode) of the function corresponding to each logical address LA. The check sum data CS is added data for detecting an error to improve the reliability of the data D.

COMMUNICATING OPERATION

Operation of the audiovisual system described above for making connection requests from the slave units $200_1 \sim 200_n$ to the master unit 200 after the master unit 200 fails to operate and then is enabled again will be described below. In this audiovisual system, each of the slave units $200_1 \sim 200_n$ transmits, by way of a self report, connection information of its own to the master unit 200 in each time period.

Figure 15:
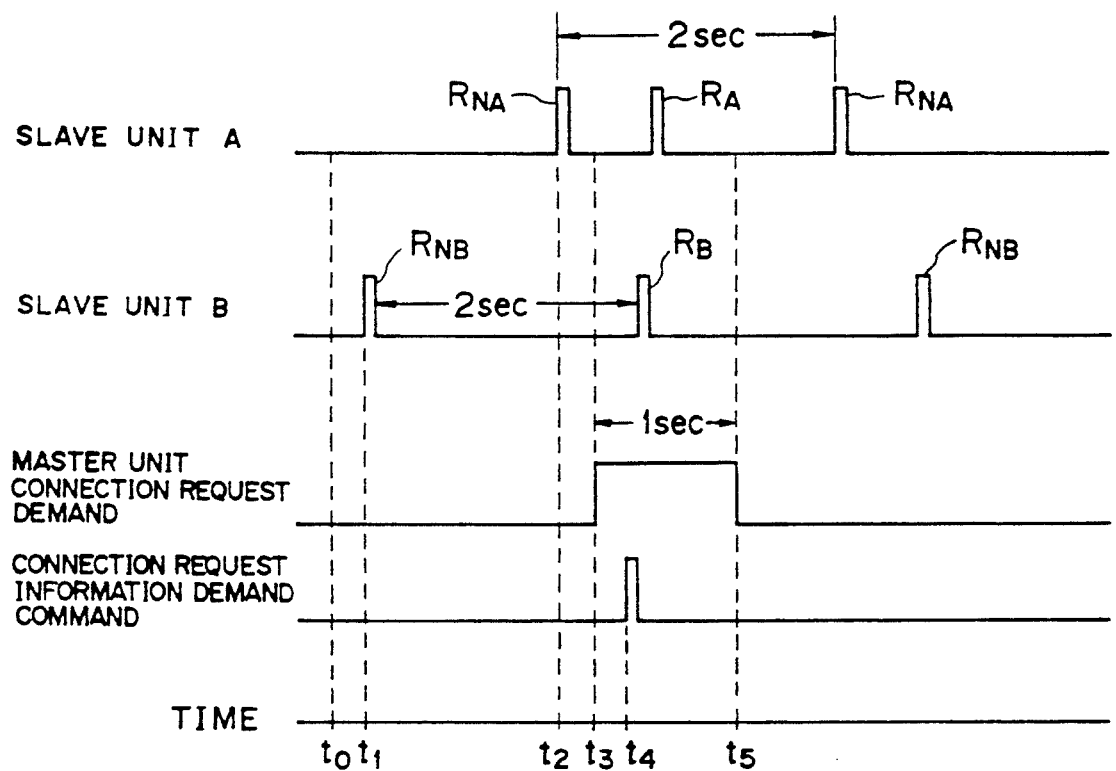
FIG. 15 is a timing chart of an operation sequence for establishing connections between master and the slave units of the audiovisual system.

FIG. 15 shows an operation sequence for establishing connections between the master and slave units of the audiovisual system.

Figure 39:
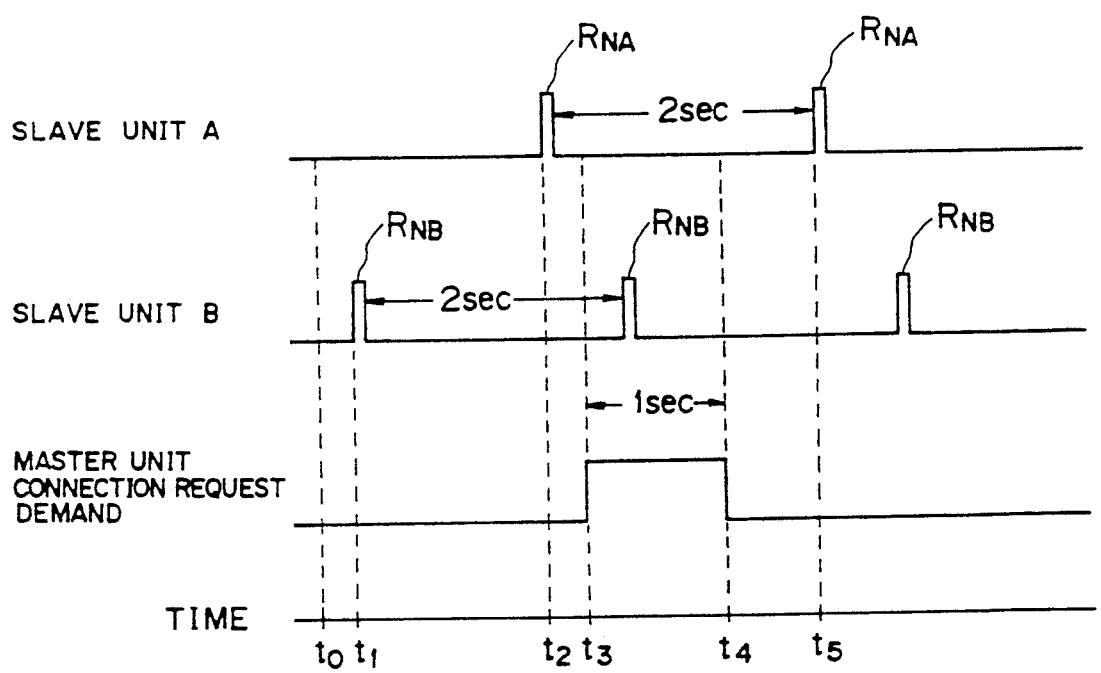
FIG. 39 is a timing chart of an operation sequence for confirming a connection between master and the slave units of a conventional automobile audiovisual system.

It is assumed in FIG. 39 that initially, the master unit is disabled due to a temporary voltage drop, for example, or the user presses a reset switch upon a malfunction of the system at a time $t_0$. The master unit fails to respond to a connection request $R_{NA}$ from a slave unit A at a time $t_2$ and a connection request $R_{NA}$ from a slave unit B at a time $t_1$. The slave controllers of the slave units A, B now serve as operation mode changing means. Thereafter, the slave units A, B enter a low power consumption mode (see FIG. 19 at (b)). Then, the slave units A, B temporarily enter a normal mode (see FIG. 19 at (a)) and send respective connection requests $R_{NA}$, $R_{NB}$ to the master unit in each fixed time period (e.g., of 2 seconds) under the control of timers in their own controllers. If no response comes back from the master unit, the slave units A, B enter the low power consumption mode again.

When the master unit is subsequently enabled at a time $t_3$, the master controller 18 functions as a connection request demand means, and sends a connection request demand command as connection request information demand data to all the slave units at a time $t_4$.

In response to the connection request demand command from the master controller 18, the slave controllers of the slave units A, B send connection requests $R_A$, $R_B$ within a wait time period ($t_3 \sim t_5$) of the master controller 18, at times different from the times for making normal connection requests.

Therefore, since the master unit can cause all the slave controllers to make connection requests within a certain time period (e.g., of 1 second), the master unit can enable the entire data communication system within a predetermined time period.

A fundamental algorithm for a communication sequence of connection requests in the first embodiment is as follows:

A1) The master controller 18 of the master unit 200 serves as a connection request demand means and transmits communication data as connection request information demand data to all the slave units.

A2) Having received the data as connection request information demand data, the slave controllers $18_{-1} \sim 18_{-n}$ of the respective slave units $200_{-1} \sim 200_{-n}$ function as connection request means, and transmit connection information of their own to the master unit 200.

The above communication sequence is stored as a control program in the controllers of the master unit 200 and the slave units $200_1 \sim 200_n$.

DATA COMMUNICATION OF CORRECTION REQUESTS

Figure 16:
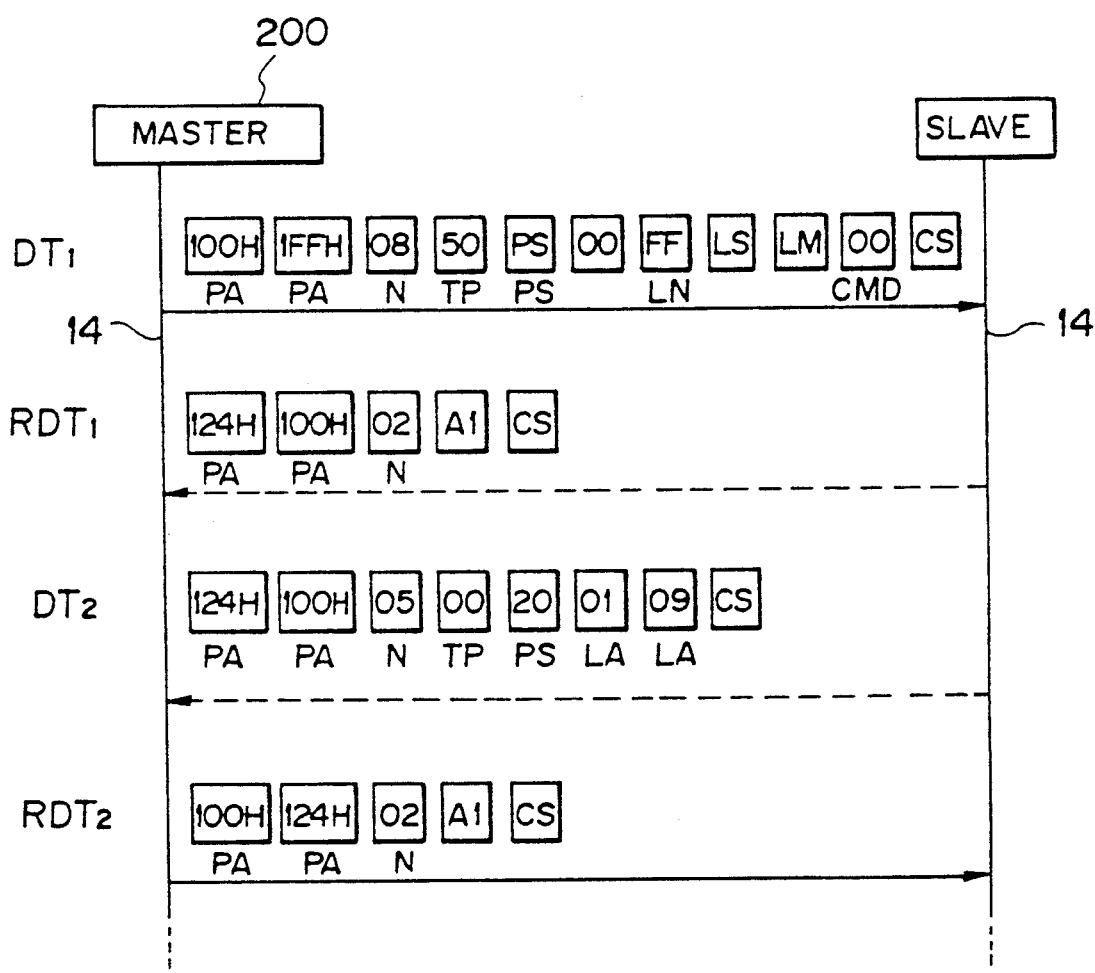
FIG. 16 is a diagram showing a communication sequence by way of example.

Data communication of connection requests after the master unit is enabled will be described in detail with reference of the communication sequence of FIG. 16. For the sake of brevity, FIG. 16 shows a sequence of data communication between the master unit 200 and a slave unit having physical address data PA="124H". The other slaves operate in the same manner as the illustrated slave unit.

As shown in FIG. 16, the master unit 200 is enabled after it has failed to operate, issuing communication data $DT_1$ as connection request information demand data to all the slave units $200_1 \sim 200_n$ through the communication bus 14. At this time, the communication data $DT_1$ has a format for sending connection information from the master unit 200 simultaneously to all the slave units $200_1 \sim 200_n$. The communication data $DT_1$ will hereinafter be referred to as "multiaddress communication data". It is assumed that the physical address data representing each of the slave units $200_1 \sim 200_n$ is of 12 bits.

If all the four high-order bits of the 12 bits of the physical address data PA of the slave units $200_1 \sim 200_n$ are "1H", then the master unit 200 transmits connection information in the multiaddress communication data in which the physical address data PA of the slave units is PA="1FFH". The slave units determine whether the four high-order bits are equal to each other with the eight low-order bits (="FFH") of the physical address data PA as mask data. Since all the slave units recognize that the four high-order bits are equal to each other, all the slave units receive the connection information.

Therefore, the master unit 200 can transmit the same connection request information demand data to all the slave units in one transmission process.

More specifically, the communication data $DT_1$ is composed of physical address data PA="100H" of the master unit, physical address data PA="1FFH" of the slave units to which the communication data DT is to be transmitted, message length data N="08H" indicating that the number of data items to be transmitted is 8, classification data TP="50H" indicating the transmission of a special command, physical status data PS, talker address data TL="00H" indicating that the controller that transmits the communication data DT is the master controller 18, listener address data LN="FFH" indicating that the controller to which the communication data DT is to be transmitted is all the slave controllers, logical status data LS, logical mode data LM, command data CMD="00H" indicating that the transmitted command is a connection request information demand command, and check sum data CS.

To indicate that the communication data $DT_1$ has been received, each of the slave units issues and transmits return data $RDT_1$, indicating that the check sum is agreed with, to the master unit.

Each of the slave units transmits connection information of its own in the form of communication data $DT_2$ to the master unit. All the slave units transmit their own connection information to the master unit. However, the data communication from only one of the slave units whose physical address data PA is PA="124H" will be described below. The communication data $DT_2$ is composed of physical address data PA="124H" of the slave unit, physical address data PA="100H" of the master unit to which the communication data $DT_2$ is to be transmitted, message length data N="05H" indicating that the number of data items to be transmitted is 5, classification data TP="00H" indicating the transmission of connection information, physical status data PS including four high-order bits of "2H" which indicate that the slave unit has two functions, first logical address data LA="01H" indicating that the first function is a display, second logical address data $LA_2$="09H" indicating that the second function is an external commander, and check sum data CS.

To indicate that the communication data $DT_2$ has been received, the master unit issues and transmits return data $RDT_2$, indicating that the check sum is agreed with, to the slave unit.

The above communication sequence allows the master unit to cause all the slave units to make connection requests in a short period of time, and hence to enable the overall system easily.

In the above embodiment, communication data as connection request information demand data is transmitted to all the slave units. If a plurality of groups of slave units having different four high-order bits of the physical address data are connected to the same communication bus, then it is possible to transmit communication data as connection request information demand data simultaneously to only those slave units belonging to one group whose four high-order bits of the physical address data are identical.

Figure 17:
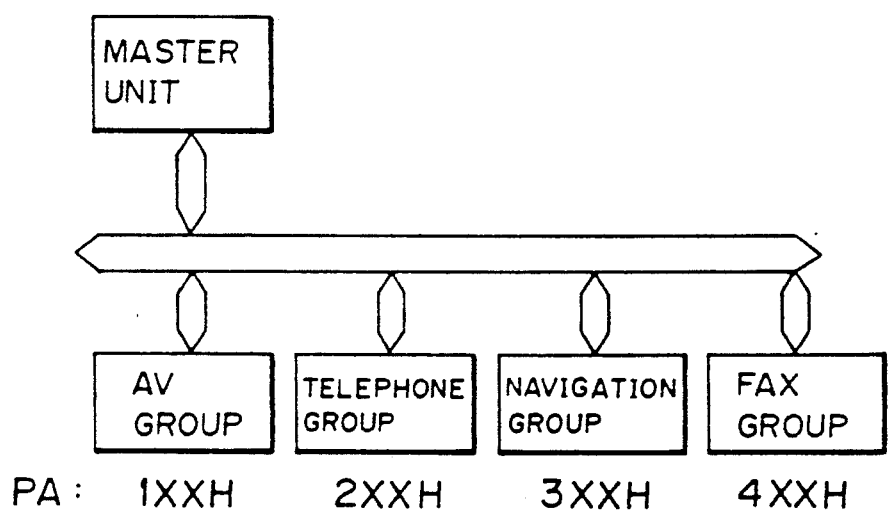
FIG. 17 is a block diagram of the connected arrangement of a modified data communication system.

For example, as shown in FIG. 17, a modified data communication system has a first group (audiovisual group) of slave units having physical address data PA whose four high-order bits are "1H", a second group (telephone group) of slave units having physical address data PA whose four high-order bits are "2H", a third group (navigation group) of slave units having physical address data PA whose four high-order bits are "3H", and a fourth group (FAX group) of slave units having physical address data PA whose four high-order bits are "4H". When the master unit transmits multiaddress communication data in the form of connection request information demand data containing physical address data PA="2FFH" of slave units to which the data is to be transmitted, the connection request information demand data is transmitted simultaneously to only the slave units belonging to the second telephone group.

Figure 19:
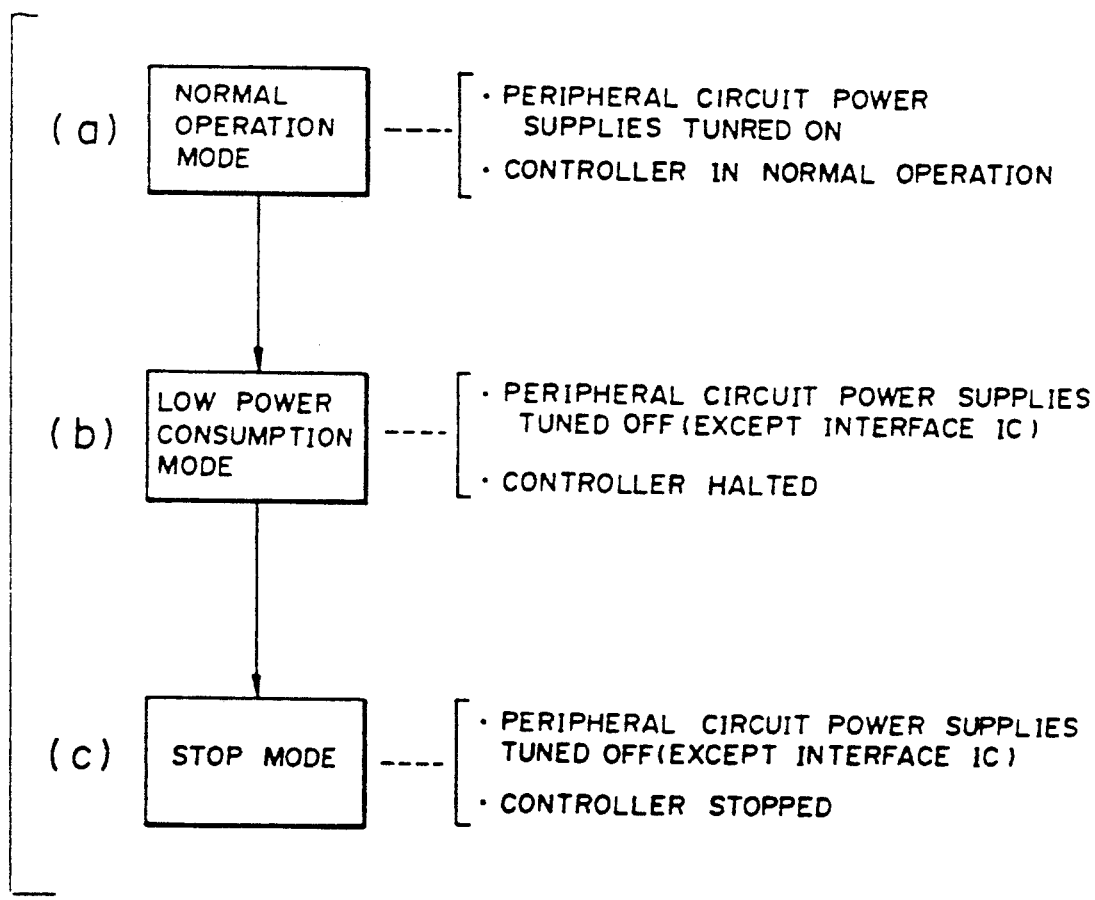
FIG. 19 is a flowchart of an operation sequence of the data communication system according to the first embodiment.

In the first embodiment, when each of the slave units enters the low power consumption mode, it turns off the power supply for peripheral circuits and the slave controller is halted or held at rest, as shown in FIG. 19 at (b). However, as shown in FIG. 18, the communication driver/receiver of the communication interface IC may be divided into a communication driver 32D and a communication receiver 32R, and only the communication receiver 32R as a data receiver may be energized in the low power consumption mode. The arrangement shown in FIG. 18 is effective to reduce the power consumption in the low power consumption mode.

In the first embodiment, when each of the slave units enters the low power consumption mode while it is standing by, the slave controller is halted. If the slave unit is required to stand by for a longer period of time, however, the slave controller may be brought into a stop mode or disabled after the low power consumption mode, as shown in FIG. 19(c), and may be enabled again in response to an interrupt caused by the reception of a connection request information demand command from the master unit. This is effective to further reduce the power consumption. The slave unit may enter the stop mode directly from the normal operation mode without the low power consumption mode.

In the illustrated first embodiment, the return data is returned after having received the connection information. However, the return data may be dispensed with if the data communication system is highly reliable in data communication.

Figure 20:
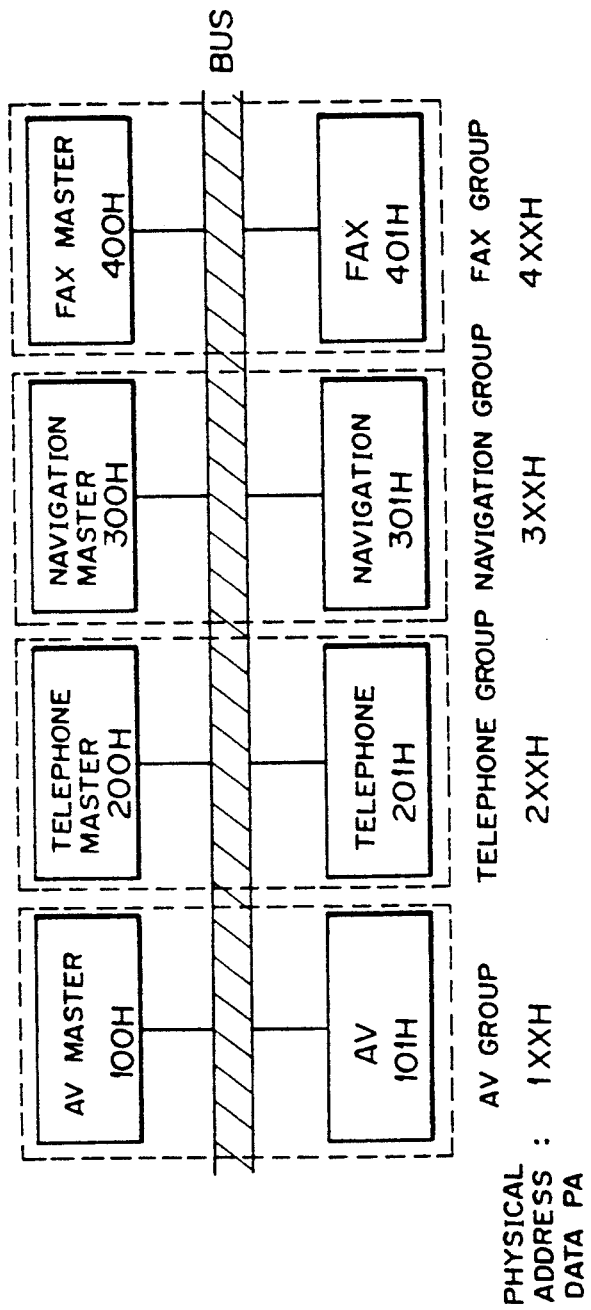
FIG. 20 is a block diagram of the connected arrangement of another modified data communication system.

The data communication system has only one master unit in the above embodiment. However, the present invention is also applicable to a data communication system having a plurality of master units, as shown in FIG. 20. In the data communication system shown in FIG. 20, the master controller of each of the master units is required to be allotted its own address (e.g., "300H" for a navigation master unit) in order to determine from or to which master unit the data is being transmitted.

[2] Second Embodiment

GENERAL ARRANGEMENT OF DATA COMMUNICATION SYSTEM

Figure 21:
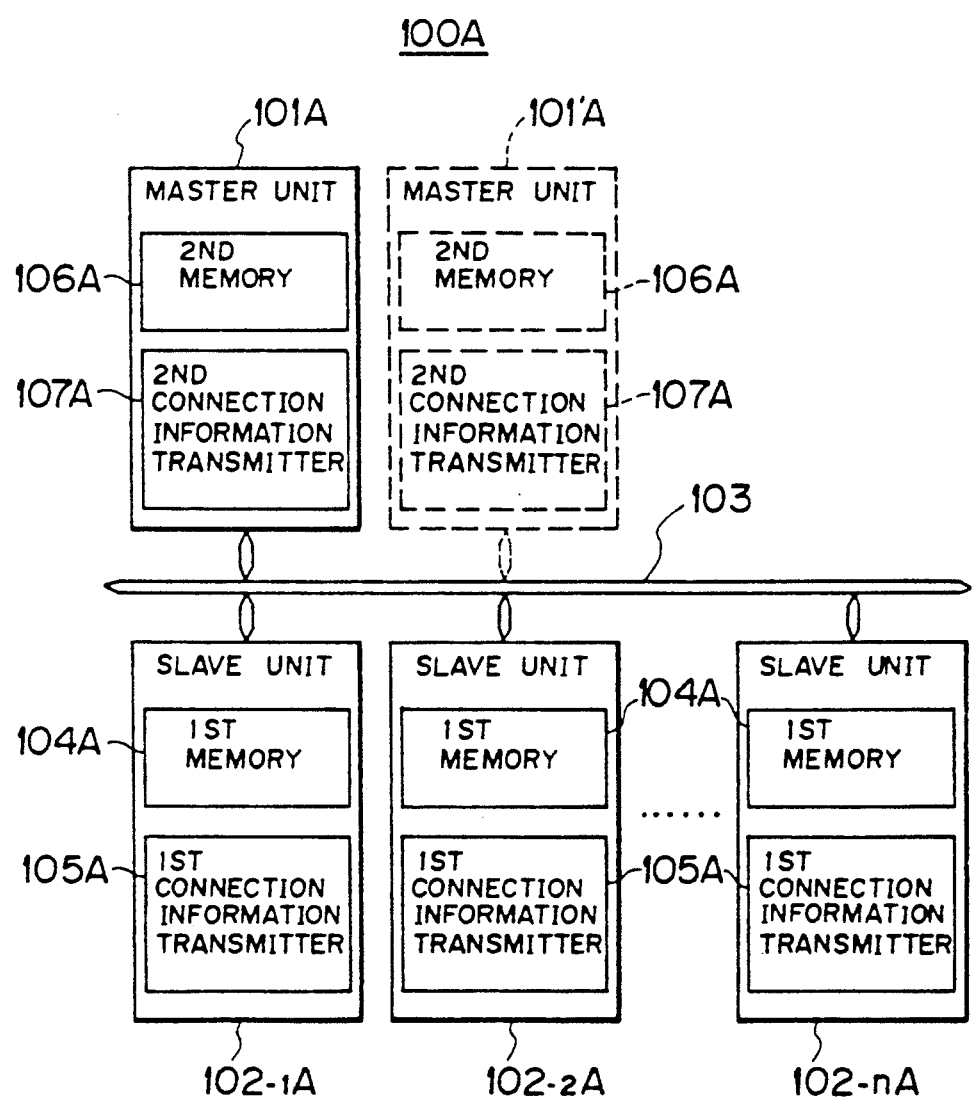
FIG. 21 is a block diagram of a data communication system according to a second embodiment of the present invention.

FIG. 21 schematically shows in block form a data communication system for use on an automobile according to a second embodiment of the present invention.

The data communication system, generally designated by the reference numeral 100A, comprises at least one master unit 101A (101'A) connected to a communication bus 103 and a plurality of slave units $102_{-1}A$, $102_{-2}A$, $\sim 102_{-n}A$ connected to the communication bus 103. Each of the slave units $102_{-1}A \sim 102_{-n}A$ has a first memory 104A for storing connection information and a first connection information transmitter 105A for transmitting, to the master unit 101A (101'A), first change information indicative of whether the connection information of its own stored in the first memory 104A is identical to the connection information of its own that has previously been transmitted to the master unit 101A (101'A) or not. The master unit 101A (101'A) has a second memory 106A for storing connection information, and a second connection information transmitter 107A for transmitting the connection information stored in the second memory 106A to the slave units $102_{-1}A \sim 102_{-n}A$ based on the first change information of the slave units $102_{-1}A \sim 102_{-n}A$.

The first memory 104A stores connection information.

The first connection information transmitter 105A transmits, to the master unit 101A (101'A), first change information indicative of whether the connection information of its own stored in the first memory 104A is identical to the connection information of its own that has previously been transmitted to the master unit 101A (101'A) or not.

The second memory 106A stores connection information.

The second connection information transmitter 107A transmits the connection information, partly or entirely, stored in the second memory 106A to the slave units $102_{-1}A \sim 102_{-n}A$ based on the first change information of the slave units $102_{-1}A \sim 102_{-n}A$.

The master and slave units of the data communication system are therefore capable of recognizing the latest connected state at all times, and may transmit connection information only when the connected state has changed. The data communication system can therefore effect data communication highly efficiently.

The data communication system according to the second embodiment is particularly useful when embodied in an audiovisual (AV) system on an automobile. The audiovisual system and data formats employed thereby are identical to those of the first embodiment described above, and hence will not be described in detail below.

TRANSMISSION OF CONNECTION INFORMATION

Transmission of connection information between the master unit 200 and the slave units $200_{-1} \sim 200_{-n}$ in the audiovisual system shown in FIG. 3, as the data communication system according to the second embodiment, will be described below. In the audiovisual system, each of the slave units $200_{-1} \sim 200_{-n}$ transmits connection information of its own in the form of a self report (periodic communication), as connection request information, to the master unit 200 in each time period.

Figure 22:
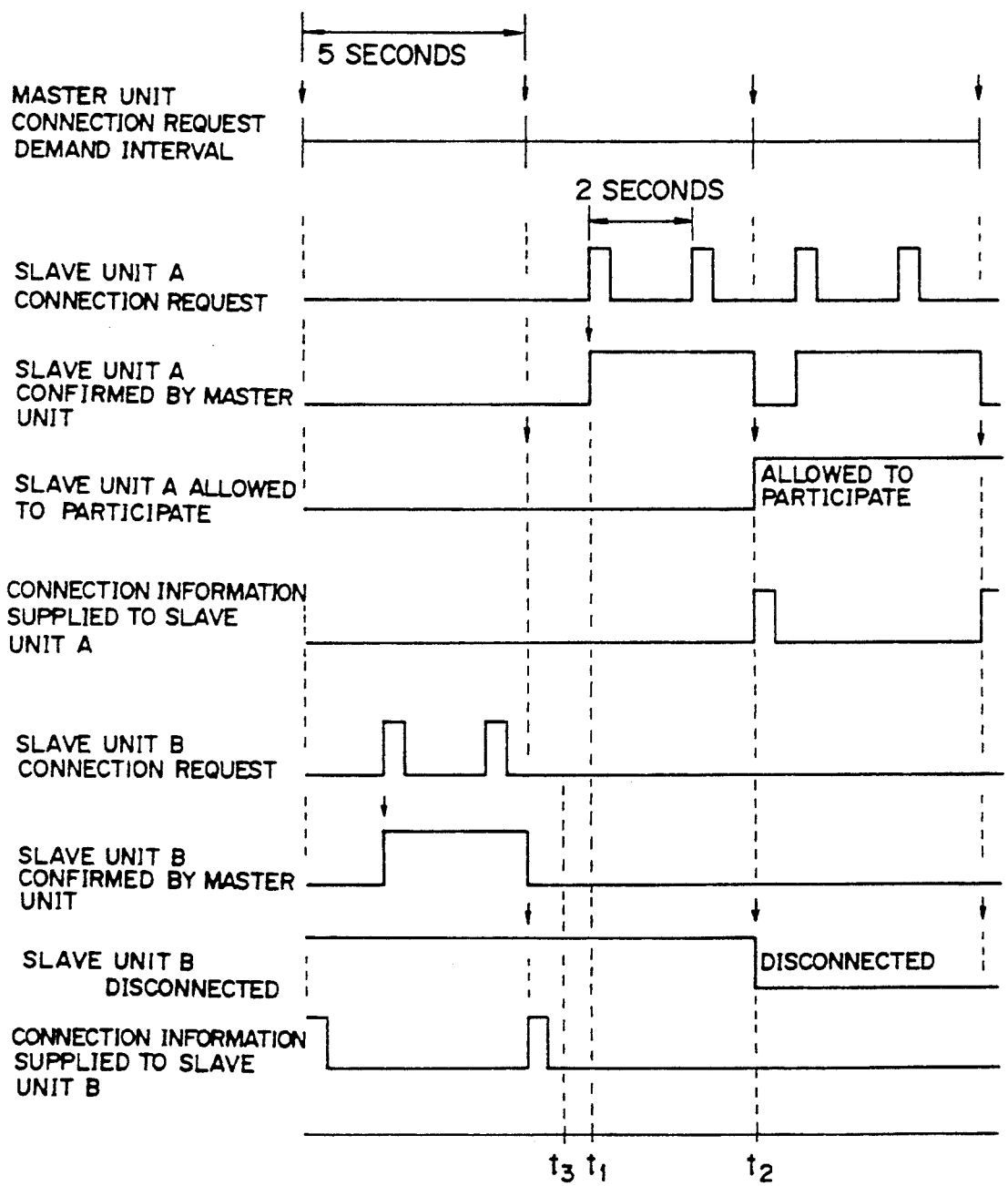
FIG. 22 is a timing chart of an operation sequence for data communication in the data communication system according to the second embodiment.

FIG. 22 is a timing chart of an operation sequence for data communication in the data communication system according to the second embodiment.

A slave unit A makes a connection request at a time $t_1$. Subsequently, the slave unit A makes a connection request in each time period (e.g., of 2 seconds). The master unit stores all connection requests made within a certain time period (e.g., of 5 seconds), and then transmits connection information to all slave units including the slave unit A at a time $t_2$.

Concurrent with this, the master unit determines whether there have been connection requests from all the slave units within a certain time period (e.g., of 5 seconds), for thereby checking the number and types of the connected slave units to confirm any slave units that have been disconnected or dropped from service or that have been newly added. For example, if a slave unit B which has been connected so far is disconnected at a time $t_3$, then the master unit receives no connection request from the slave unit B at the time $t_2$ when the master unit confirms the number of connected slave units. Thereafter, the master unit regards the slave unit B as being disconnected, and subsequently transmits the connection information of its own and of all the slave units except the slave unit B at the time $t_2$. Conversely, when the slave unit A is newly connected and requests a connection at the time $t_1$, the master unit determines that the slave unit A has not requested a connection so far, and subsequently transmits the connection information of its own and of all the slave units including the slave unit A at the time $t_2$.

Sequences of data communication or transfer data transfer sequences of the data communication system according to the second embodiment will be described below with reference to FIGS. 23 through 34.

Basically, the data transfer sequences include a communication sequence for periodic communication and a communication sequence in the event that the number or types of connected slave units have changed.

(1) COMMUNICATION SEQUENCE FOR PERIODIC COMMUNICATION

Basic algorithms for the communication sequence for periodic communication include A) a communication sequence algorithm to be followed when the connection information of slave units has not changed, B) a communication sequence algorithm to be followed when the connection information of slave units has changed, and C) a communication sequence algorithm to be followed when the connection information of a master unit has changed.

Communication sequence algorithm A)

A1) The slave controller of each of the slave units functions as a first connection information transmitting means, and transmits, as communication data, classification data TP including first change information, but does not transmit its own connection information.

A2) Upon reception of the first change information, the master controller of the master unit recognizes that the connection information of the slave units has not changed, and functions as a second connection information transmitting means and transmits classification data TP including second change information to all the slave units.

Communication sequence algorithm B)

B1) The slave controller of each of the slave units functions as a first connection information transmitting means, and transmits classification data TP including first change information, and also transmits its own connection information that has changed as communication data.

B2) Upon reception of the first change information and the connection information of the slave units, the master controller of the master unit stores the connection information in a memory as a second memory means, and functions as a second connection information transmitting means and transmits classification data TP including second change information, its own connection information, and the connection information of all the salve units that is stored in the memory to all the slave units.

Communication sequence algorithm C)

C1) The master controller of the master unit transmits classification data TP including second change information and also transmits its own connection information that has changed as communication data.

(2) COMMUNICATION SEQUENCE IN THE EVENT THAT THE NUMBER OR TYPES OF CORRECTED SLAVE UNITS ARE CHANGED

Basic algorithms for the communication sequence in the event that the number or types of connected slave units have changed D) a communication sequence algorithm to be followed when a slave unit is disconnected, and E) a communication sequence algorithm to be followed when a slave unit is newly connected.

Communication sequence algorithm D)

D1) If no periodic communication is received from a slave unit from which connection information has previously received, then the master controller of the master unit determines that the slave unit is disconnected, and functions as a second connection information transmitting means and transmits classification data TP including second change information, its own connection information stored in a memory as a second memory means, and the connection information of all the salve units except the disconnected slave unit, to all the slave units.

Communication sequence algorithm E)

E1) The slave controller of a newly connected slave unit functions as a first connection information transmitting means, and transmits classification data TP including first change information, and also transmits its own connection information that has changed as communication data.

E2) Upon reception of the first change information and the connection information of the slave unit, the master controller of the master unit newly stores the connection information of the slave unit in a memory as a second memory means, and functions as a second connection information transmitting means and transmits classification data TP including second change information, its own connection information, and the connection information of all the salve units including the newly connected slave unit, stored in the memory to all the slave units.

The above communication sequences are stored as a control program in the controllers of the master unit 200 and the slave units $200_{-1} \sim 200_{-n}$.

(I) PERIODIC COMMUNICATION FOR TRANSMITTING CORRECTING INFORMATION

Periodic communication for transmitting connection information will be described in detail below with reference to FIGS. 23 through 27.

(i) Periodic Communication sequence at the time the connection information of a slave unit has not changed This periodic communication sequence is carried out when the connection information of a slave unit has not changed. According to this sequence, only data corresponding to first change information is transmitted, and the connection information of the slave unit is not transmitted.

Figure 23:
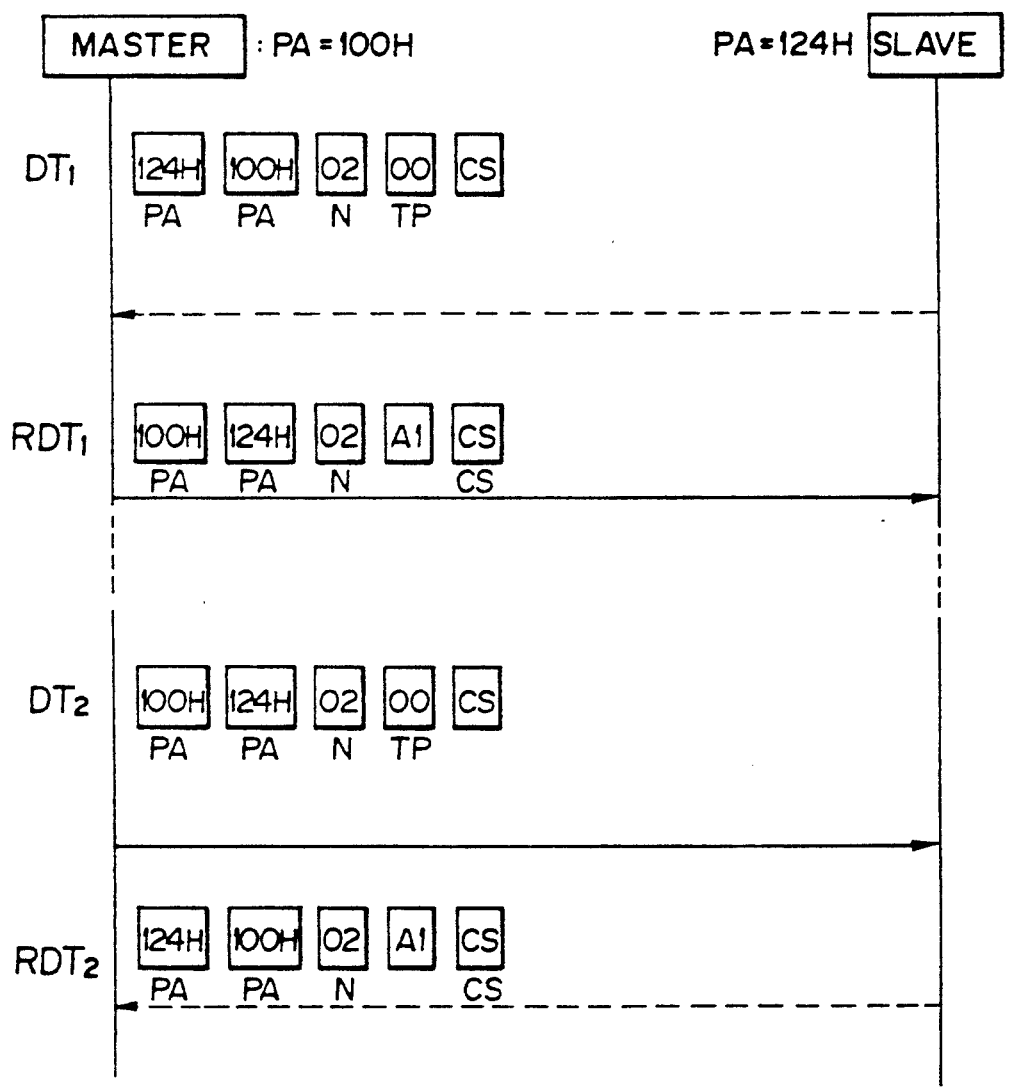
FIG. 23 is a diagram illustrative of a sequence of data communication in the data communication system according to the second embodiment.

As shown in FIG. 23, the slave unit (indicated by PA = "124H") issues and transmits communication data $DT_1$ through the communication bus 14 to the master unit to transfer its own connection information. More specifically, the communication data $DT_1$ is composed of physical address data PA = "124H" of the slave unit, physical address data PA = "100H" of the master unit to which the communication data $DT_1$ is to be transmitted, message length data N = "02H" indicating that the number of data items to be transmitted is 2, classification data TP whose four high-order bits are "0H" indicating the transmission of connection information and whose four low-order bits are "0H" indicating that the connection information to be transmitted as first change information has not changed, and check sum data CS.

To indicate that the connection information has been received, the master unit issues return data $RDT_1$, indicating that the check sum is agreed with, to the slave unit.

To further indicate that the connection status of the overall system has not changed, the master unit issues communication data $DT_2$ corresponding to second change information indicating that all the slave units have not changed and transmits the communication data $DT_2$ at a predetermined transmission time. In this case, the master unit transmits the communication data $DT_2$ to all the slave units. For the sake of brevity, however, the transmission of the communication data $DT_2$ to the above slave unit indicated by PA = "124H" will be described below. The communication data $DT_2$ is composed of physical address data PA = "100H" of the master unit, physical address data PA = "124H" of the slave unit to which the communication data $DT_2$ is to be transmitted, message length data N "02H" indicating that the number of data items to be transmitted is 2, classification data TP whose four high-order bits are "0H" indicating the transmission of connection information and whose four low-order bits are "0H" indicating that the connection information to be transmitted as first change information has not changed, and check sum data CS.

To indicate that the connection information has been received, the slave unit issues return data $RDT_2$, indicating that the check sum is agreed with, to the master unit.

With the above communication sequence, the master and slave units keep on holding the connection information which has been held without updating it, and effect data communication based on the connection information that is held.

(ii) Periodic communication sequence at the time the connection information of a slave unit has changed - case 1

This periodic communication sequence is carried out when the connection information of a slave unit has changed. According to this sequence, after the master unit has received communication data from a slave unit, the master unit transmits connection information of all the slave units.

Figure 24:
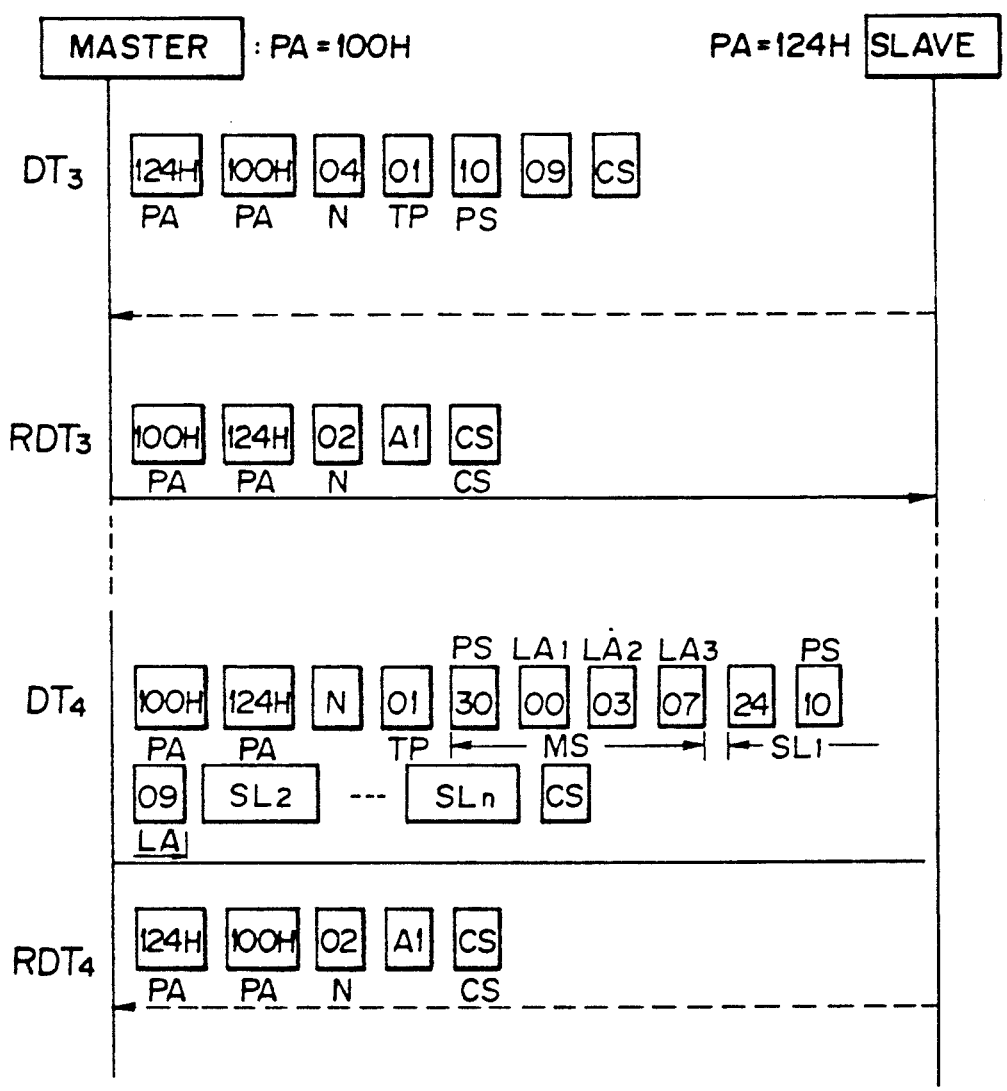
FIG. 24 is a diagram illustrative of another sequence of data communication in the data communication system according to the second embodiment.

If a situation occurs which changes the connection information of the slave unit whose physical address data is PA="124H", e.g., if the display unit whose logical address data is LA="01H" fails to operate and only the external commander whose logical address data is LA "09H" functions, then the slave unit issues and transmits communication data $DT_3$, as shown in FIG. 24, through the communication bus 14 to the master unit to transfer its own connection information that has changed. More specifically, the communication data $DT_3$, is composed of physical address data PA="124H" of the slave unit, physical address data PA ="100H" of the master unit to which the communication data $DT_3$ is to be transmitted, messge length data N="04H" indicating that the number of data items to be transmitted is 4, classification data TP whose four high-order bits are "0H" indicating the transmission of connection information and whose four low-order bits are "1H" indicating that the connection information to be transmitted as first change information has changed, logical address data LA="09H" indicating that the function that is presently available is the external commander, and check sum data CS.

To indicate that the connection information has been received, the master unit issues return data $RDT_3$, indicating that the connection information has been received, to the slave unit.

Because the four low-order bits of the classification data TP are "1H", the master unit recognizes that the connection information of the slave unit has changed, and issues and transmits communication data $DT_4$ including second information indicating the connection information change to each of the slave units. For the sake of brevity, only the transmission of the communication data $DT_4$ to the above slave unit with the physical address data PA="124H" will be described below.

The communication data $DT_4$ is composed of physical address data PA="100H" of the master unit, physical address data PA="124H" of the slave unit to which the communication data $DT_4$ is to be transmitted, message length data N indicating the number of data items to be transmitted, classification data TP whose four low-order bits are "1H" indicating that the connection information to be transmitted has changed, connection information MS of the master unit, connection information $SL_1 \sim SL_n$ of all the slave units, and check sum data CS.

The connection information MS of the master unit indicates that the master unit has three functions because four high-order bits of physical status data PS are "3H", and also that the available functions are a master unit, a cassette tape deck, and a tuner because first logical address data is $LA_1$="00H", second logical address data is $LA_2$="03H", and third logical address data is $LA_3$="07H".

The connection information of the aforesaid slave unit indicated by the physical address data PA="124H" is transmitted as connection information $SL_1$. The connection information $SL_1$ indicates that it is the connection information of the slave unit because eight low-order bits of the physical address data PA of the slave unit are "24H", that the slave unit has one function because four high-order bits of the physical status data PS are "1H", and also that the available function is an external commander because the logical address data is LA="09H". The connection information $SL_2 \sim SL_n$ of the other slave units also has the same contents as described above.

To indicate that the communication data $DT_4$ has been received, the slave unit issues return data $RDT_4$ to the master unit.

With the above communication sequence, each of the slave units updates the connection information which has been held so far, and effects subsequent communication with the master unit based on the new connection information.

(iii) Periodic communication sequence at the time the connection information of a slave unit has changed - case 2

This periodic communication sequence is carried out when the connection information of a slave unit has changed. According to this sequence, the master unit transmits only the connection information, which has changed, of a slave unit to all the slave units.

Figure 25:
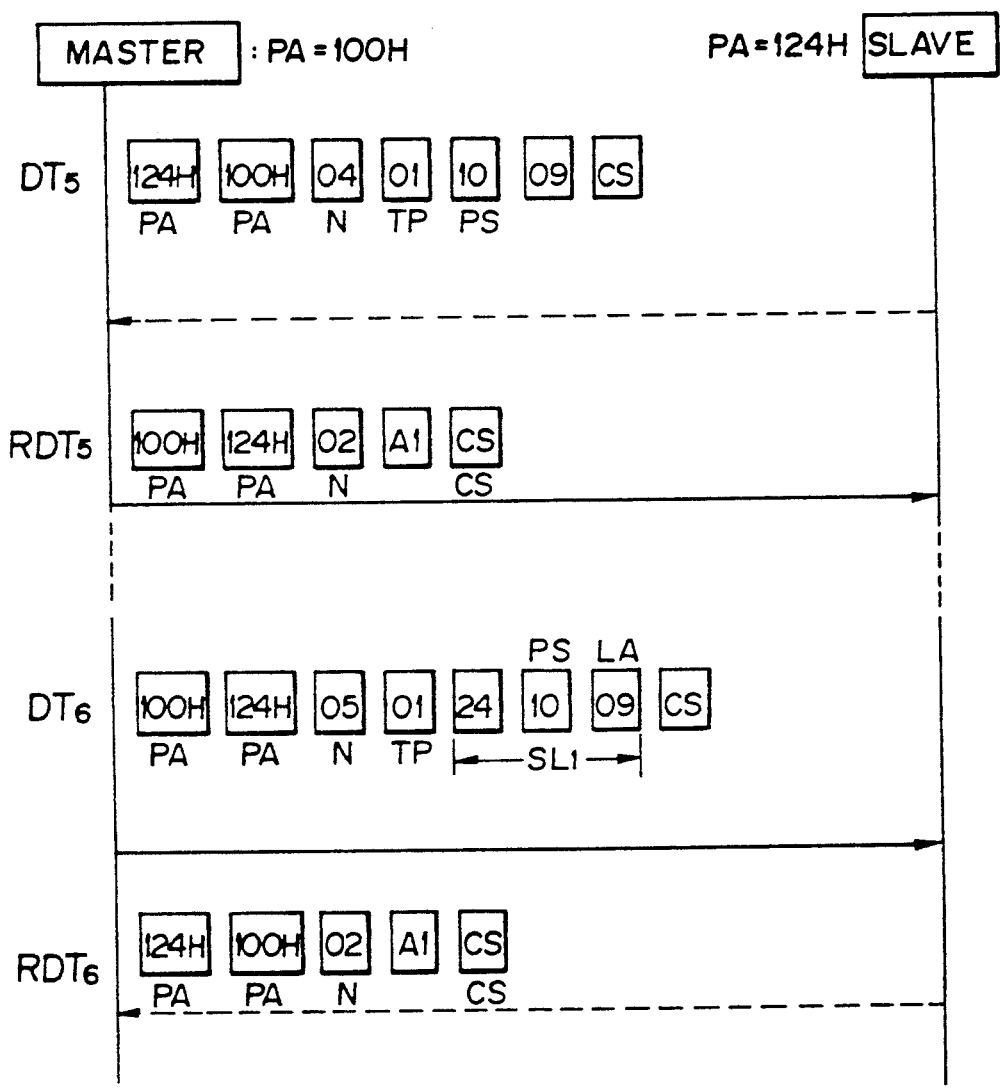
FIG. 25 is a diagram illustrative of still another sequence of data communication in the data communication system according to the second embodiment.

If a situation occurs which changes the connection information of the slave unit whose physical address data is PA="124H", e.g., if the display unit fails to operate, then the slave unit issues and transmits communication data $DT_5$, as shown in FIG. 25, through the communication bus 14 to the master unit to transfer its own connection information that has changed.

To indicate that the connection information has been received, the master unit issues return data $RDT_5$, indicating that the connection information has been received, to the slave unit.

Because the four low-order bits of the classification data TP are "1H", the master unit recognizes that the connection information of the slave unit has changed, and issues and transmits communication data $DT_6$ including second information indicating the connection information change to each of the slave units. For the sake of brevity, only the transmission of the communication data $DT_6$ to the above slave unit with the physical address data PA="124H" will be described below.

The communication data DT is composed of physical address data PA="100H" of the master unit, physical address data PA="124H" of the slave unit to which the communication data $DT_6$ is to be transmitted, message length data N="05H" indicating that the number of data items to be transmitted is 5, classification data TP whose four high-order bits are "0H" indicating the transmission of connection information and whose four low-order bits are "1H" indicating that the connection information to be transmitted has changed, connection information $SL_1$ of the slave unit whose connection information has changed, and check sum data CS.

The connection information $SL_1$ indicates that it is the connection information of the slave unit because eight low-order bits of the physical address data PA of the slave unit are "24H", that the slave unit has one function because four high-order bits of the physical status data PS are "1H", and also that the available function is an external commander because the logical address data is LA="09H".

To indicate that the communication data $DT_6$ has been received, the slave unit issues return data $RDT_6$ to the master unit.

With the above communication sequence, each of the slave units updates only a newly notified portion of the connection information which has been held so far, and effects subsequent communication with the master unit based on the new connection information.

Since the master unit is not required to transmit all connection information, but to transmit only the connection information, which has changed, of the slave unit, the time in which the communication bus is occupied by the transmission of the connection information is shortened.

(iv) Periodic communication sequence at the time the connection information of the master unit has changed - case 1

This periodic communication sequence is carried out when the connection information of a master unit has changed. According to this sequence, the master unit transmits its own connection information that has changed and connection information of all the slave units.

Figure 26:
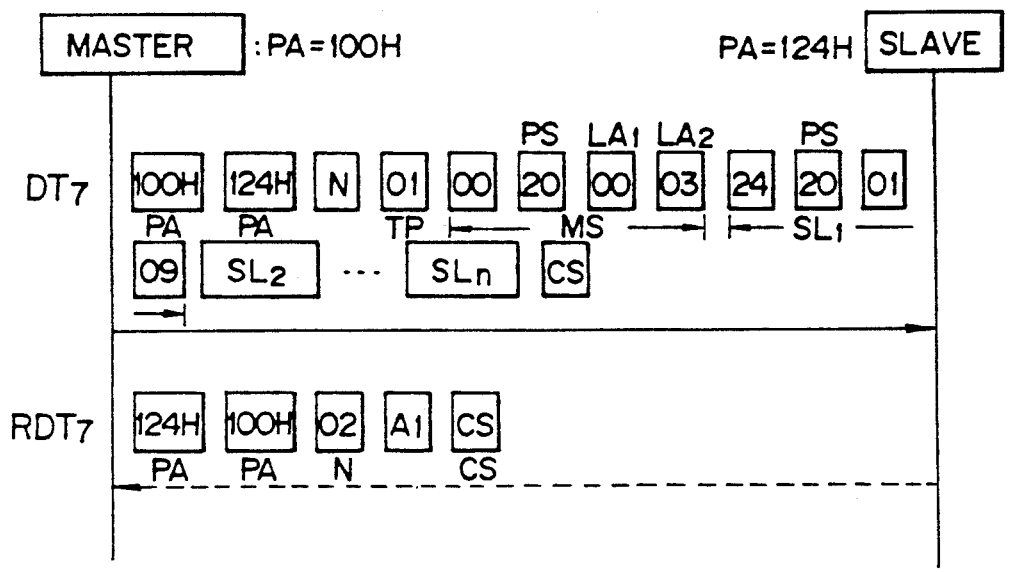
FIG. 26 is a diagram illustrative of a further sequence of data communication in the data communication system according to the second embodiment.

The master unit issues and transmits communication data $DT_7$, as shown in FIG. 26, through the communication bus 14 to all the slave units to transfer its own connection information that has changed. More specifically, the communication data $DT_7$ is composed of physical address data PA="100H" of the master unit, physical address data PA="124H" of the slave unit to which the communication data $DT_7$ is to be transmitted, message length data N indicating the number of data items to be transmitted, classification data TP whose four high-order bits are "0H" indicating the transmission of connection information and whose four low-order bits are "1H" indicating that the connection information to be transmitted has changed, connection information MS of the master unit, connection information $SL_1 \sim SL_n$ of all the slave units, and check sum data CS.

The connection information MS of the master unit indicates that the connection information of the master unit has changed because eight low-order bits of the physical address data PA of the master data are "00H", that the tuner function, for example, of the master unit fails and the master unit presently has two functions because four high-order bits of the physical status data PS are "2H", and also that the available functions are a master unit and a cassette tape deck because first logical address data is $LA_1$="00H", and second logical address data is $LA_2$="03H".

The connection information $SL_1 \sim SL_n$ of all the slave units are also added as described above.

To indicate that the communication data $DT_7$ has been received, the slave unit issues return data $RDT_7$ to the master unit.

With the above communication sequence, each of the slave units updates the connection information which has been held so far, and effects subsequent communication with the master unit based on the new connection information.

Periodic communication sequence at the time the connection information of the master unit has changed - case 2

This periodic communication sequence is carried out when the connection information of a master unit has changed. According to this sequence, the master unit transmits its own connection information that has changed and does not transmit connection information of all the slave units.

Figure 27:
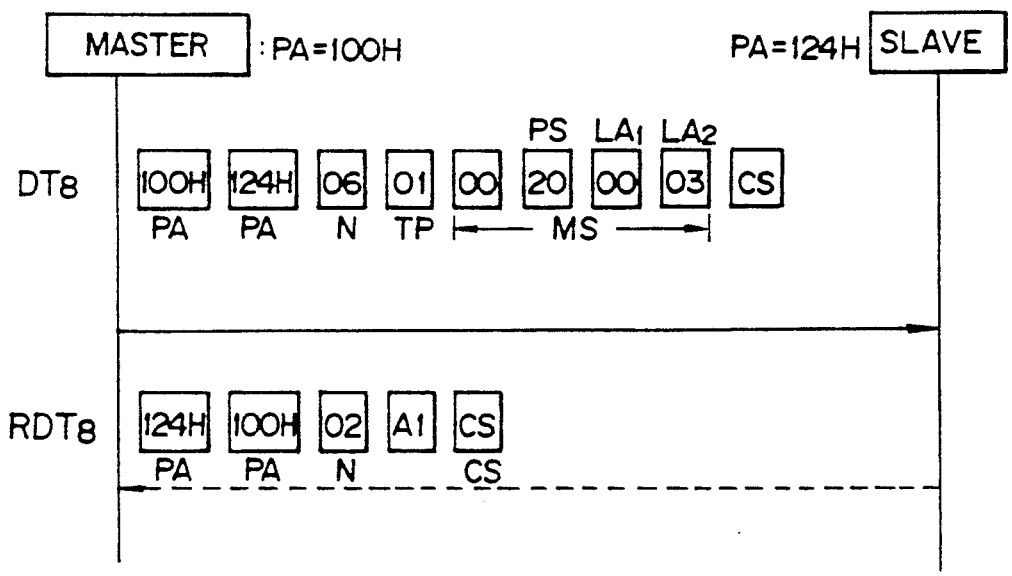
FIG. 27 is a diagram illustrative of a still further sequence of data communication in the data communication system according to the second embodiment.

The master unit issues and transmits communication data $DT_8$, as shown in FIG. 27, through the communication bus 14 to all the slave units to transfer its own connection information that has changed. More specifically, the communication data $DT_8$ is composed of physical address data PA="100H" of the master unit, physical address data PA="124H" of the slave unit to which the communication data $DT_8$ is to be transmitted, message length data N "06H" indicating that the number of data items to be transmitted is 6, classification data TP whose four high-order bits are "0H" indicating the transmission of connection information and whose four low-order bits are "1H" indicating that the connection information to be transmitted has changed, connection information MS of the master unit, and check sum data CS.

The connection information MS of the master unit indicates that the connection information of the master unit has changed because eight low-order bits of the physical address data PA of the master unit are "00H", that the tuner function, for example, of the master unit fails and the master unit presently has two functions because four high-order bits of the physical status data PS are "2H", and also that the available functions are a master unit and a cassette tape deck because first logical address data is $LA_1$ = "00H", and second logical address data is $LA_2$="03H".

To indicate that the communication data $DT_8$ has been received, the slave unit issues return data $RDT_8$ to the master unit.

With the above communication sequence, each of the slave units updates only the connection information, which has been held so far, of the master unit, and effects subsequent communication with the master unit based on the new connection information.

(II) COMMUNICATION SEQUENCE WHEN THE NUMBER OR TYPES OF SLAVE UNITS HAVE CHANGED

Communication sequences for transmitting connection information when the number or types of slave units have changed will be described in detail below with reference to FIGS. 28 through 32.

i) Communication sequence at the time a slave unit is disconnected

If it is assumed, as shown in FIG. 28, that n slave units $200_{-1} \sim 200_{-n}$ are connected to a communication bus, then communication data $DT_9$ (see FIG. 30) is normally transmitted as connection information from the master unit to all the slave units. The communication data $DT_9$ is composed of physical address data PA="100H" of the master unit, physical address data PA="124H", for example, of the slave unit to which the communication data $DT_9$ is to be transmitted, message length data N indicating the number of data items to be transmitted, classification data TP whose four high-order bits are "0H" indicating the transmission of connection information and whose four low-order bits are "1H" indicating that the connection information to be transmitted has changed, connection information MS of the unit, connection information $SL_1 \sim SL_n$ of all the slave units, and check sum data CS.

To indicate that the communication data $DT_9$ has been received, the slave unit issues return data $RDT_9$ to the master unit.

Figure 29:
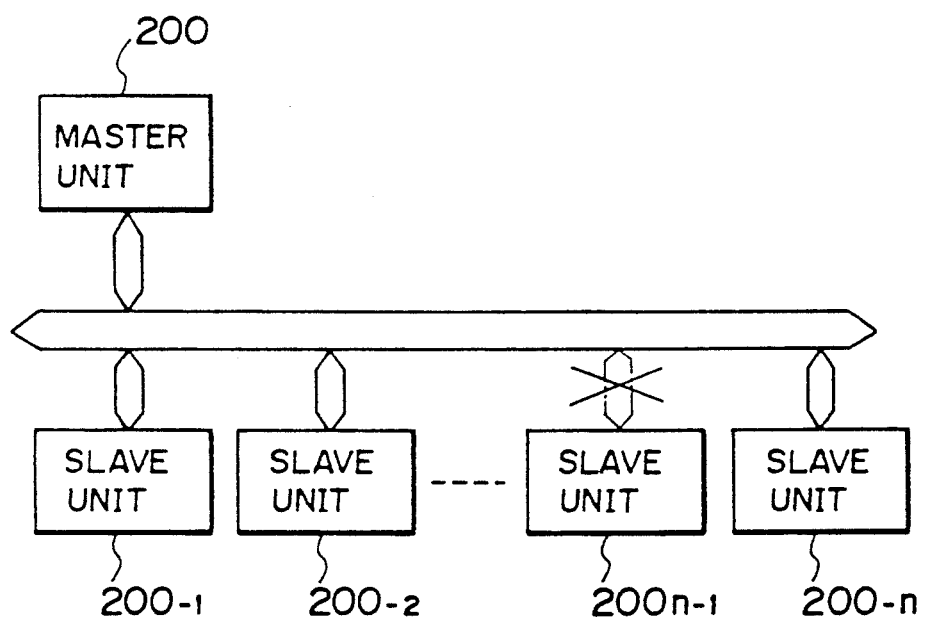
FIG. 29 is a block diagram of another connected arrangement of the data communication system according to the second embodiment.
Figure 30:
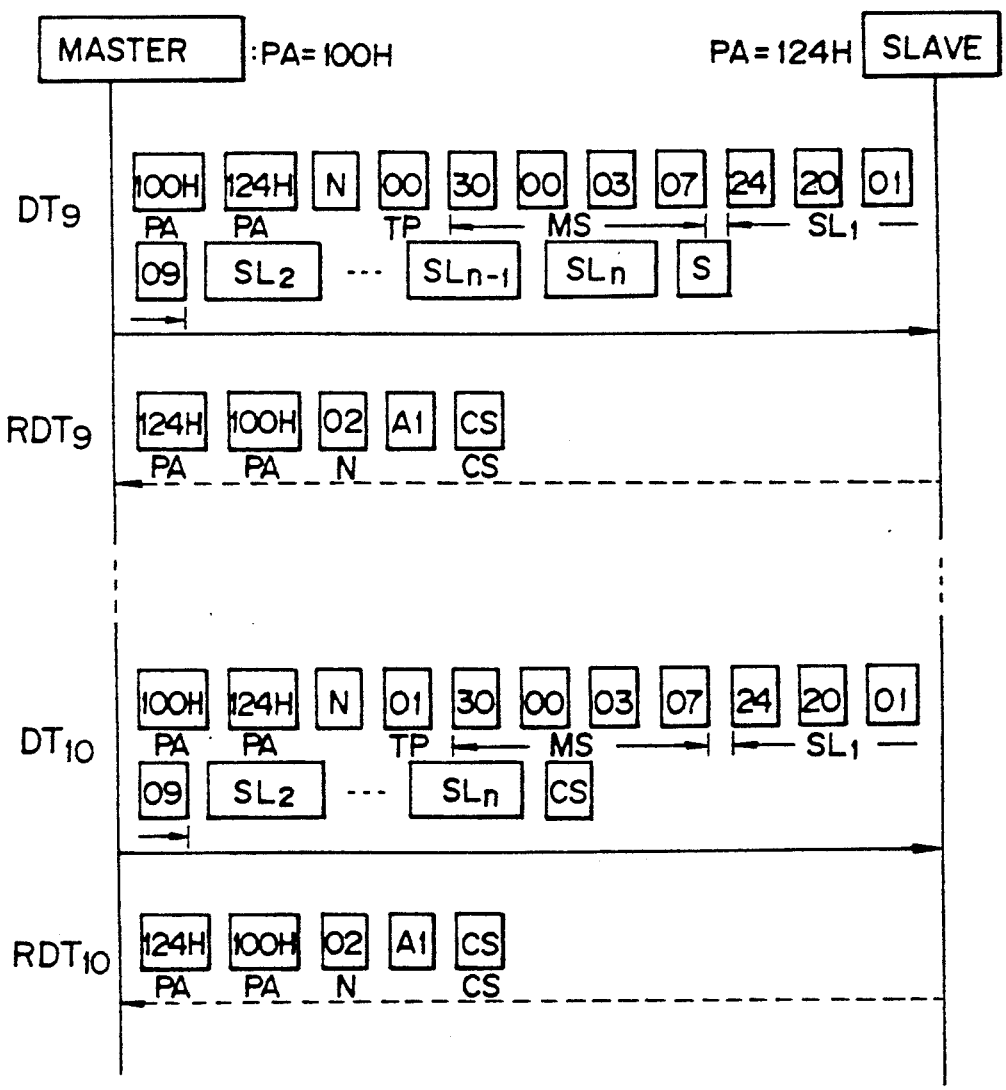
FIG. 30 is a diagram illustrative of another sequence of data communication in the data communication system according to the second embodiment when a slave unit is disconnected.

Thereafter, if the slave unit $200_{n-1}$ is disconnected due, for example, to a malfunction of its slave controller, as shown in FIG. 29, and no periodic communication comes from the slave unit $200_{n-1}$ within a predetermined period of time after the previous periodic communication has finished, then the master unit regards the slave unit $200_{n-1}$ as being disconnected from the communication bus through comparison with the previous connection information. The master unit determines that the connected state has changed, and issues and transmits communication data $DT_{10}$ to all the slave units (see FIG. 30). The communication data $DT_{10}$ is composed of physical address data PA="100H" of the master unit, physical address data PA="124H", for example, of the slave unit to which the communication data $DT_{10}$ is to be transmitted, message length data N indicating the number of data items to be transmitted, classification data TP whose four high-order bits are "0H" indicating the transmission of connection information and whose four low-order bits are "1H" indicating that the connection information to be transmitted has changed, connection information MS of the master unit, connection information $SL_1 \sim SL_n$ (except the connection information $SL_{n-1}$) of all the slave units, and check sum data CS.

To indicate that the communication data $DT_{10}$ has been received, the slave unit issues return data $RDT_9$ to the master unit.

ii) Communication sequence at the time a slave unit is newly connected

If it is assumed, as shown in FIG. 29, that n slave units $200_{-1} \sim 200_{-n}$ are connected to a communication bus, then communication data $DT_{11}$ (see FIG. 32) is normally transmitted as connection information from the master unit to all the slave units. The communication data $DT_{11}$ is composed of physical address data PA="100H" of the master unit, physical address data PA="124H", for example, of the slave unit to which the communication data $DT_{11}$ is to be transmitted, message length data N indicating the number of data items to be transmitted, classification data TP whose four high-order bits are "0H" indicating the transmission of connection information and whose four low-order bits are "0H" indicating that the connection information to be transmitted has not changed, connection information MS of the master unit, connection information $SL_1 \sim SL_n$ of all the slave units, and check sum data CS.

To indicate that the communication data $DT_{11}$ has been received, the slave unit issues return data $RDT_{11}$ to the master unit.

Figure 31:
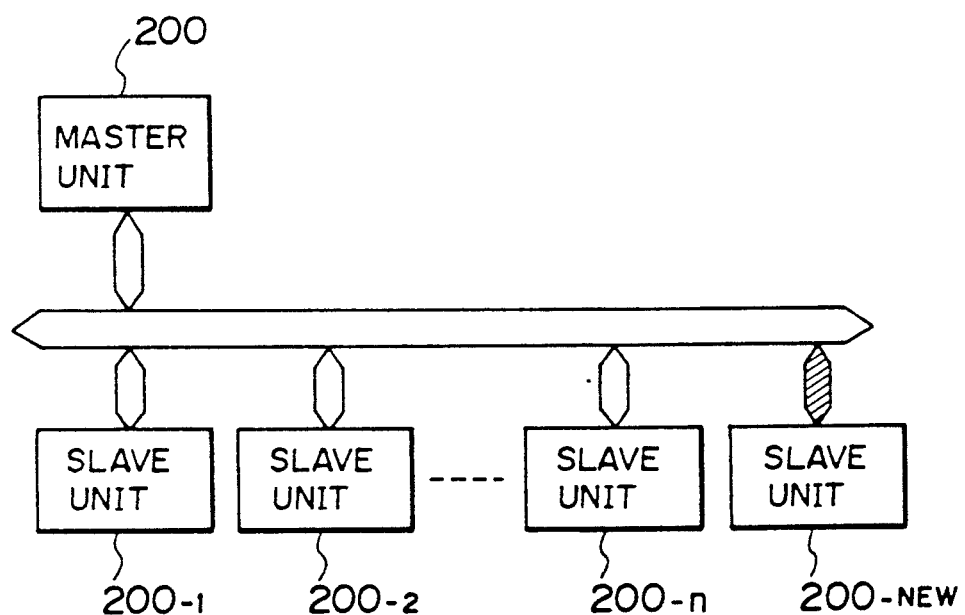
FIG. 31 is a block diagram of still another connected arrangement of the data communication system according to the second embodiment.
Figure 32:
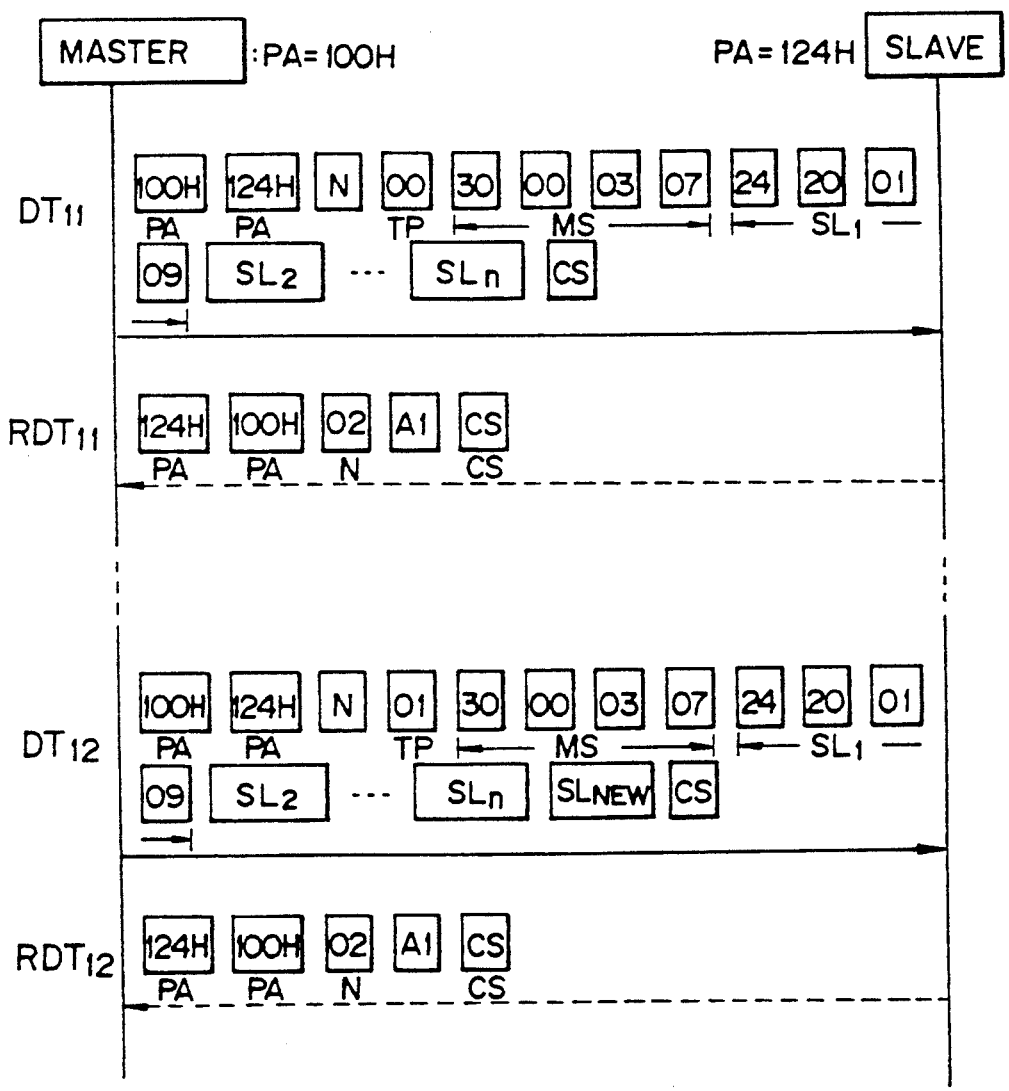
FIG. 32 is a diagram illustrative of a sequence of data communication in a data communication system according to a third embodiment of the present invention when a slave unit is newly connected.

Thereafter, if a slave unit $200_{NEW}$ is newly connected and a connection request is made by the slave unit $200_{NEW}$, as shown in FIG. 31, then the master unit determines that the slave unit $200_{NEW}$ has been newly connected through comparison with the previous connection information. The master unit determines that the connected state has changed, and issues and transmits communication data $DT_{12}$ to all the slave units (see FIG. 32). The communication data $DT_{12}$ is composed of physical address data PA="100H" of the master unit, physical address data PA="124H", for example, of the slave unit to which the communication data $DT_{12}$ is to be transmitted, message length data N indicating the number of data items to be transmitted, classification data TP whose four high-order bits are "0H" indicating the transmission of connection information and whose four low-order bits are "1H" indicating that the connection information to be transmitted has changed, connection information MS of the master unit, connection information $SL_1 \sim SL_n$ of all the existing slave units, connection information $SL_{NEW}$ of the newly connected slave unit $200_{NEW}$, and check sum data CS.

To indicate that the communication data $DT_{12}$ has been received, the slave unit issues return data $RDT_{12}$ to the master unit.

All the slave units now recognize that the slave unit $200_{NEW}$ has been connected to the communication bus, and can communicate with each other and the newly connected slave unit $200_{NEW}$.

In the above communication sequence, the number of connected slave units is changed. However, in the event that the number of connected slave units remains unchanged and only the type of a slave unit is changed, since such a type change is equivalent to the disconnection of the slave unit and the connection of a new slave unit, the aforesaid communication sequences at the time a slave unit is disconnected and a slave unit is newly connected are carried out.

[3] Third Embodiment

In the second embodiment, connection information is transmitted from the master unit individually to the slave units. According to the third embodiment, connection information is transmitted from the master unit simultaneously to all the slave units or a plurality of slave units of all the slave units.

Figure 33:
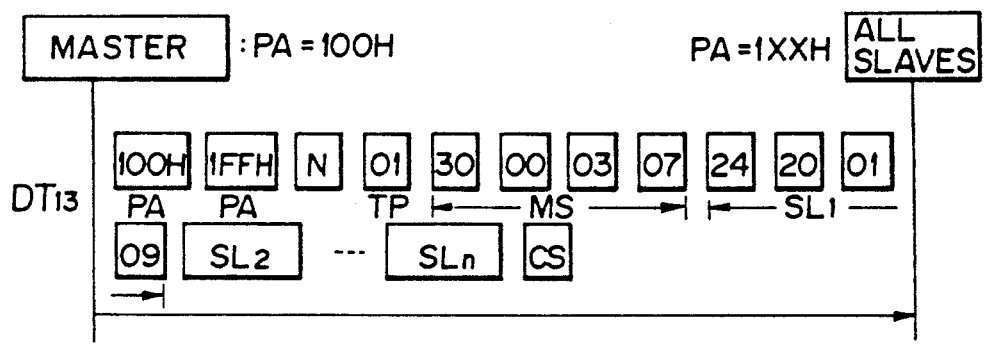
FIG. 33 is a diagram illustrative of another sequence of data communication in the data communication system according to the third embodiment when connection information is transmitted from a master unit simultaneously to a plurality of slave units.

In FIG. 33, communication data $DT_{13}$ has a format for sending connection information from the master unit simultaneously slave units that have been selected by the master unit. Such communication data that is simultaneously transmitted is called "multiaddress communication data". It is assumed that the physical address data representing each of the slave units is of 12 bits.

If all the four high-order bits of the 12 bits of the physical address data PA of the slave units are "1H", then the master unit transmits connection information in the multiaddress communication data in which the physical address data PA of the slave units is PA="1FFH". The slave units determine whether the four high-order bits are equal to each other with the eight low-order bits (="FFH") of the physical address data PA as mask data. Since all the slave units recognize that the four high-order bits are equal to each other, all the slave units receive the connection information.

Therefore, the master unit can transmit the same connection request information demand data to all the slave units in one transmission process, so that the time in which the communication bus is occupied by the transmission of the connection information is shortened. Thereafter, each of the slave units transmits return data indicating that the connection information has received, back to the master unit.

In the above embodiment, the connection information is transmitted from the master unit simultaneously to all the slave units. In the case where a plurality of groups of slave units whose physical address data PA have different four high-order bits are connected to one communication bus, it is possible to transmit connection information simultaneously only to those slave units which belong to a group or groups whose physical address data PA have the same four high-order bits.

Figure 34:
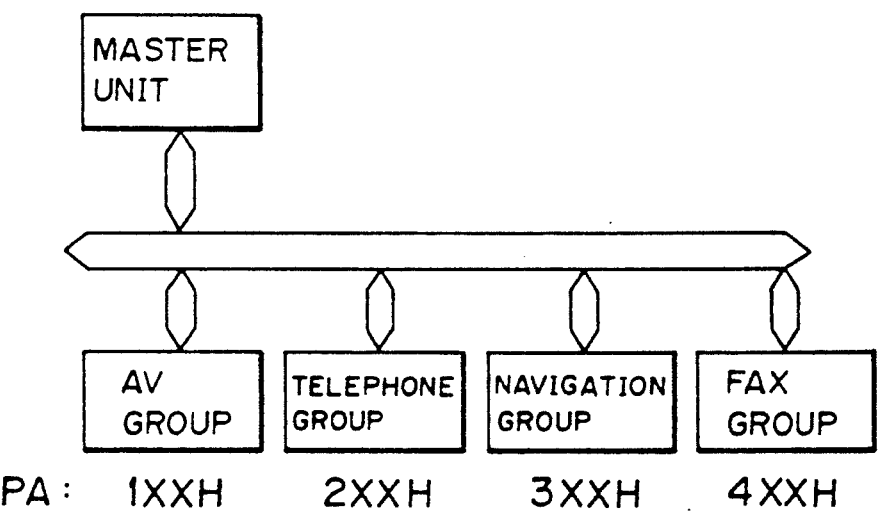
FIG. 34 is a block diagram of a connected arrangement of the data communication system according to the third embodiment.

For example, FIG. 34 shows a data communication system having a first group (audiovisual group) of slave units having physical address data PA whose four high-order bits are "1H", a second group (telephone group) of slave units having physical address data PA whose four high-order bits are "2H", a third group (navigation group) of slave units having physical address data PA whose four high-order bits are "3H", and a fourth group (FAX group) of slave units having physical address data PA whose four high-order bits are "4H". When the master unit transmits multiaddress communication data in the form of connection information containing physical address data PA="2FFH" of slave units to which the data is to be transmitted, the connection information is transmitted simultaneously to only the slave units belonging to the second group (telephone group).

[4] Fourth Embodiment

GENERAL ARRANGEMENT OF DATA COMMUNICATION SYSTEM

Figure 35:
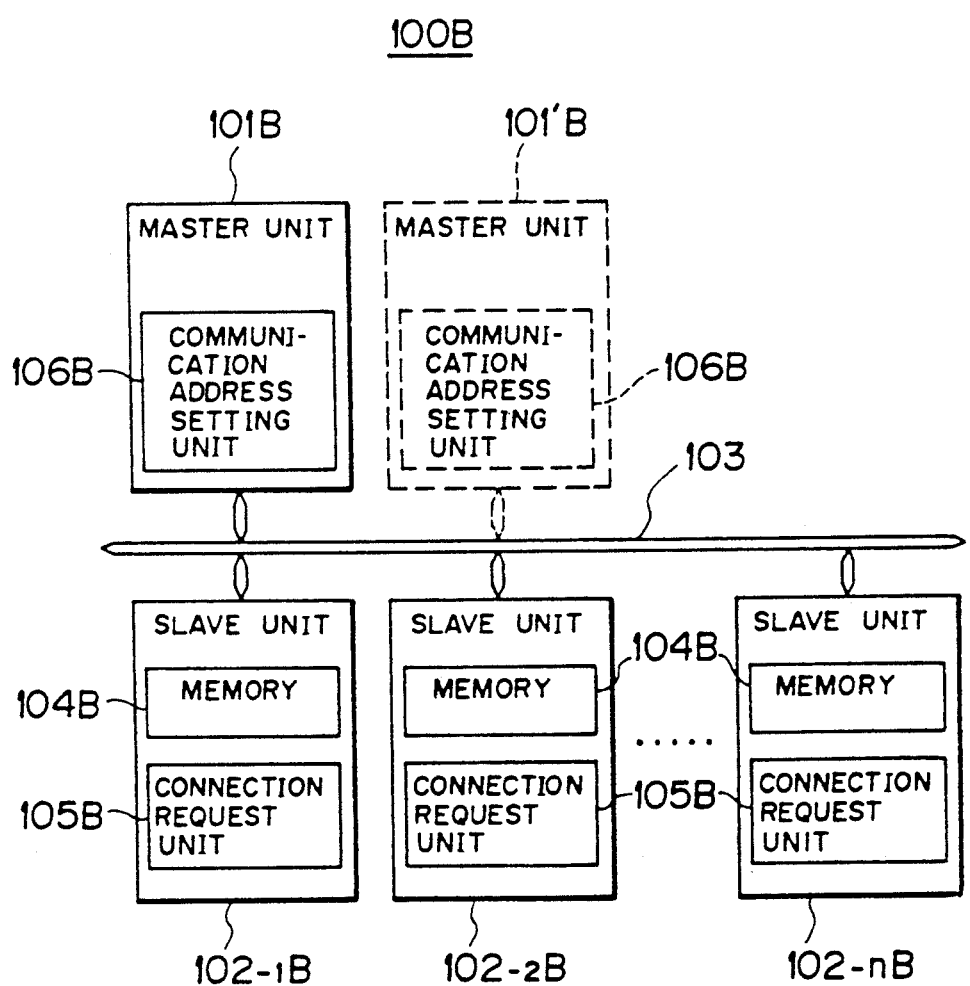
FIG. 35 is a block diagram of a data communication system according to a fourth embodiment of the present invention.

FIG. 35 schematically shows in block form a data communication system for use on an automobile according to a fourth embodiment of the present invention.

The data communication system, generally designated by the reference numeral 100B, comprises at least one master unit 101B (101'B) connected to a communication bus 103 and a plurality of slave units $102_{-1}B$, $102_{-2}B$, $\sim 102_{-n}B$ connected to the communication bus 103. Each of the slave units $102_{-1}B \sim 102_{-n}B$ has a memory 104B for storing its own communication address updatably, and a connection request unit 105B for transmitting its own connection request information to the master unit 101B (101'B) when the data communication system is enabled or starts to operate. The master unit 101B (101'B) has a communication address setting unit 106B, which when the connection request information is received from the slave units, establishes communication addresses for the slave units, different from those of the other slave units, and informs the slave units of the established communication addresses.

When the data communication system starts to operate, the connection request unit 105B of the respective slave units $102_{-1}B$, $102_{-2}B$, $\sim 102_{-n}B$ transmit their own connection request information to the master unit 101B (101'B).

When the master unit 101B (101'B) receives the connection request information from the slave units, the communication address setting unit 106B establishes communication addresses for the slave units, different from those of the other slave units, and sends the established communication addresses to the slave units.

The memory 104B of the respective slave units $102_{-1}B$, $102_{-2}B$, $\sim 102_{-n}B$ store their own communication addresses sent from the master unit 101B (101'B). Therefore, the different communication addresses are set up for the respective slave units $102_{-1}B$, $102_{-2}B$, $\sim 102_{-n}B$.

The data communication system according to the fourth embodiment of the present invention will be described in detail below. The data communication system according to the fourth embodiment is particularly useful when embodied in an audiovisual (AV) system on an automobile. The data formats employed by the audiovisual system are identical to those of the first embodiment described above, and hence will not be described in detail below.

ARRANGEMENT OF AUDIOVISUAL SYSTEM

Figure 36:
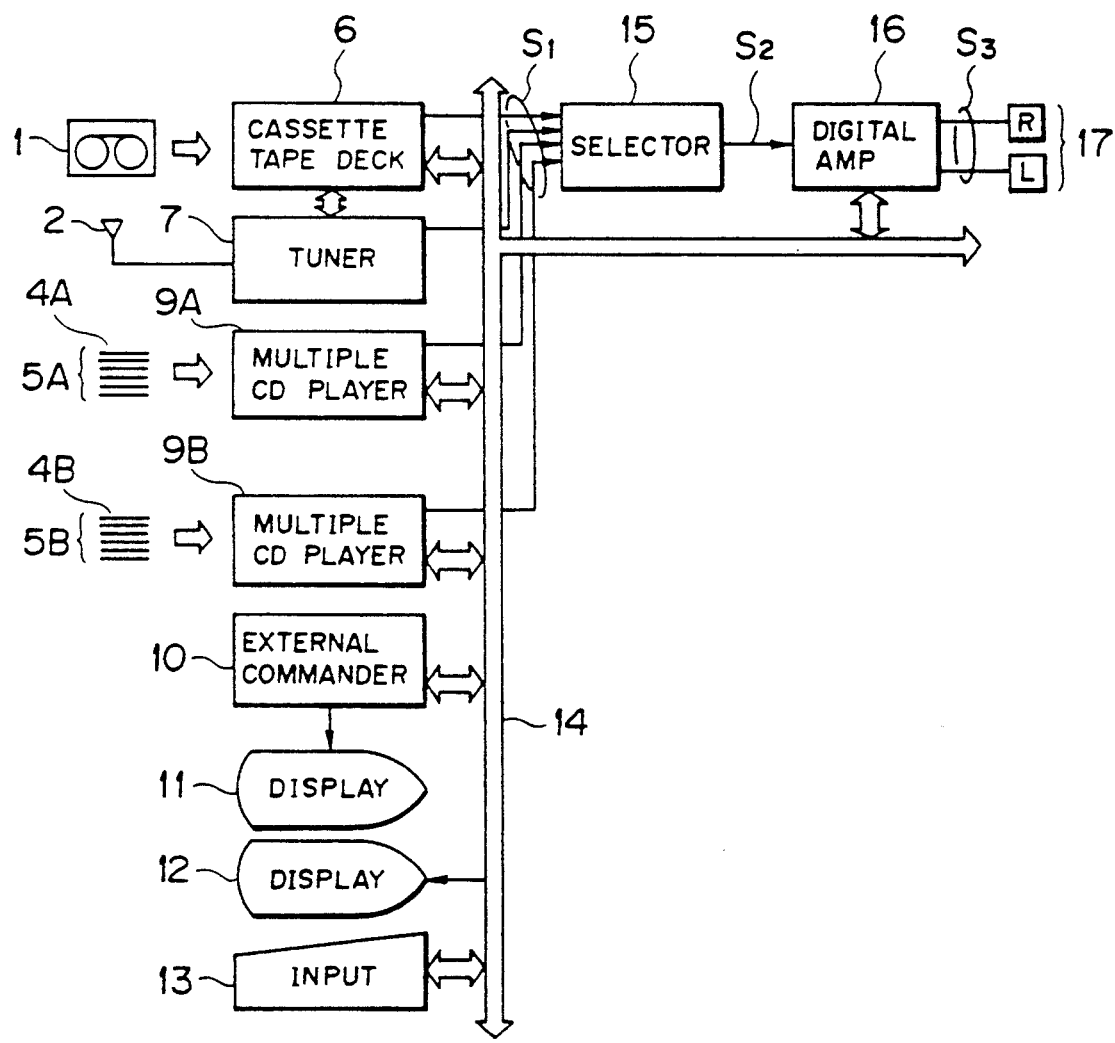
FIG. 36 is a block diagram of an audiovisual system as the data communication system according to the fourth embodiment.

FIG. 36 shows a detailed systematic arrangement of the audiovisual system. The audiovisual system has audio reproducing components and visual reproducing components. The audio reproducing components include a cassette tape deck 6 for reproducing recorded audio signals from a cassette tape 1, a tuner 7 such as an AM/FM tuner for reproducing radio signals which are received by an antenna 2, a multiple CD player 9A having an automatic CD changer 5A for reproducing recorded signals from multiple CDs 4A, and a multiple CD player 9B having an automatic CD changer 5B for reproducing recorded signals from multiple CDs 4B. The visual reproducing components include a TV tuner contained in the tuner 7, for reproducing TV signals received by the antenna 2, and a display unit 12 for displaying images based on the TV signals and also displaying still images based on signals from the CD players 9A, 9B if a CD-ROM is played back by the CD players 9A, 9B. Typically, a CD-ROM is employed by a navigation system. The audiovisual system has an external commander 10 which is in the form of a keyboard for entering various operation commands. A display unit 11 is connected to the external commander 10. The audiovisual system also has an input unit 13, which may be incorporated in the external commander 10.

The above components of the audiovisual system have respective controllers for controlling their own operation. These controllers are connected to each other through a communication bus 14, thereby making up a communication bus control network. The control network is shown in FIG. 4.

Reproduced signals S from the audio reproducing components are selectively applied through a selector 15 as a reproduced signal $S_2$ to a digital amplifier 16. After the reproduced signal $S_2$ has been amplified by the digital amplifier 16, it is applied as reproduced signals $S_3$ to loudspeakers 17 from which the reproduced sounds $S_3$ are outputted. The digital amplifier 16 contains a digital signal processing circuit which is controlled by a controller in the digital amplifier 16, the controller being connected to the communication bus 14.

Figure 37:
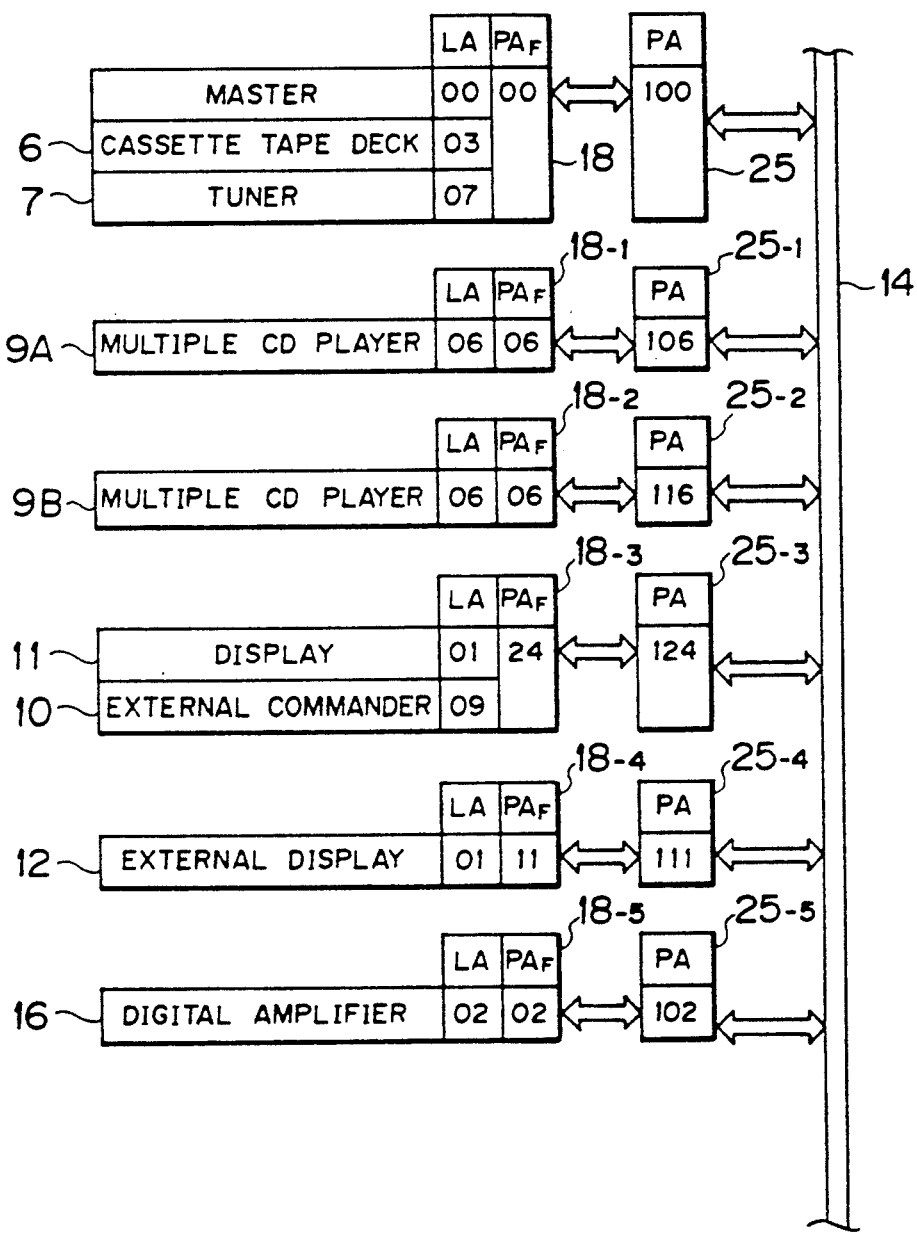
FIG. 37 is a diagram illustrative of an example in which physical and logical addresses are assigned in the data communication system according to the fourth embodiment.

FIG. 37 shows an example in which the units shown in FIG. 36 are allotted physical address data PA. In FIG. 37, the physical address data PA are established for master and slave controllers $18 \sim 18_{-5}$. This is to take into account the fact that two functional elements, such as the cassette tape deck 6 and the tuner 7, are connected to one master controller 18, as with the master unit 200 (see FIG. 4). If one controller is combined with one function, then the physical address data PA and the logical address data LA indicate the same address, as with slave controllers $18_{-1}$, $18_{-2}$, $18_{-5}$.

COMMUNICATING OPERATION

Operation of the audiovisual system described above for making connection requests from the slave units $200_1 \sim 200_n$ to the master unit 200 and also for transmitting communication data DT to establish communication addresses when the system is enabled will be described below. In this audiovisual system, all of the slave units $200_1 \sim 200_n$ transmit a self report to the master unit 200. The master unit 200 does not initiate any positive action to access the slave units $200_1 \sim 200_n$.

Basic algorithms for sequences to make connection requests and establish communication addresses at the time the audiovisual system starts to operate will be described below.

1) The slave controller of each of the slave units functions as a connection request means, and, after having detected when the power supply thereof is turned on, accesses the master unit, and make a connection request using a temporary communication address.

2) The master controller of the master unit functions as a communication address setting means, and, in response to the connection request, transmits an established communication address to the slave controller using the temporary communication address.

There is only one slave unit, at a time, whose connection request is accepted by the master unit. If another slave unit having the same slave controller as that of the slave unit whose connection request is accepted by the master unit attempts to access the master unit by making a connection request using a temporary communication address after having detected when its power supply is turned on, since the power supply is turned on at a different time, the connection request from the other slave unit is not accepted by the master unit. Only the slave unit whose connection request is accepted by the master unit receives an established communication address, stores the received established communication address in its own memory, and will use the established communication address for subsequent communication.

3) The connection request from the other slave unit, which has not previously been accepted by the master unit, is subsequently accepted by the master unit, and, in response to this connection request, the master controller of the master unit transmits an established communication address, different from the previously established communication address, to the other slave unit using the temporary communication address. Only the other slave unit receives the established communication address, stores the received established communication address in its own memory, and will use the established communication address for subsequent communication.

In this manner, based on the fact that the power supplies of the slave units are turned on at different times, all the slave units are allotted respective communication addresses that are different from each other.

The above communication sequence is stored as a control program in the controllers of the master unit 200 and the slave units $200_{-1} \sim 200_{-n}$. The connected state of the slave units $200_{-1} \sim 200_{-n}$ their power supplies are turned off is stored in the RAM $M_{10}$ (see FIG. 4) of the master unit 200, and the slave units $200_{-1} \sim 200_{-n}$ store their own established communication addresses in their respective memories $M_{11} \sim M_{1n}$ (see FIG. 4).

Figure 38:
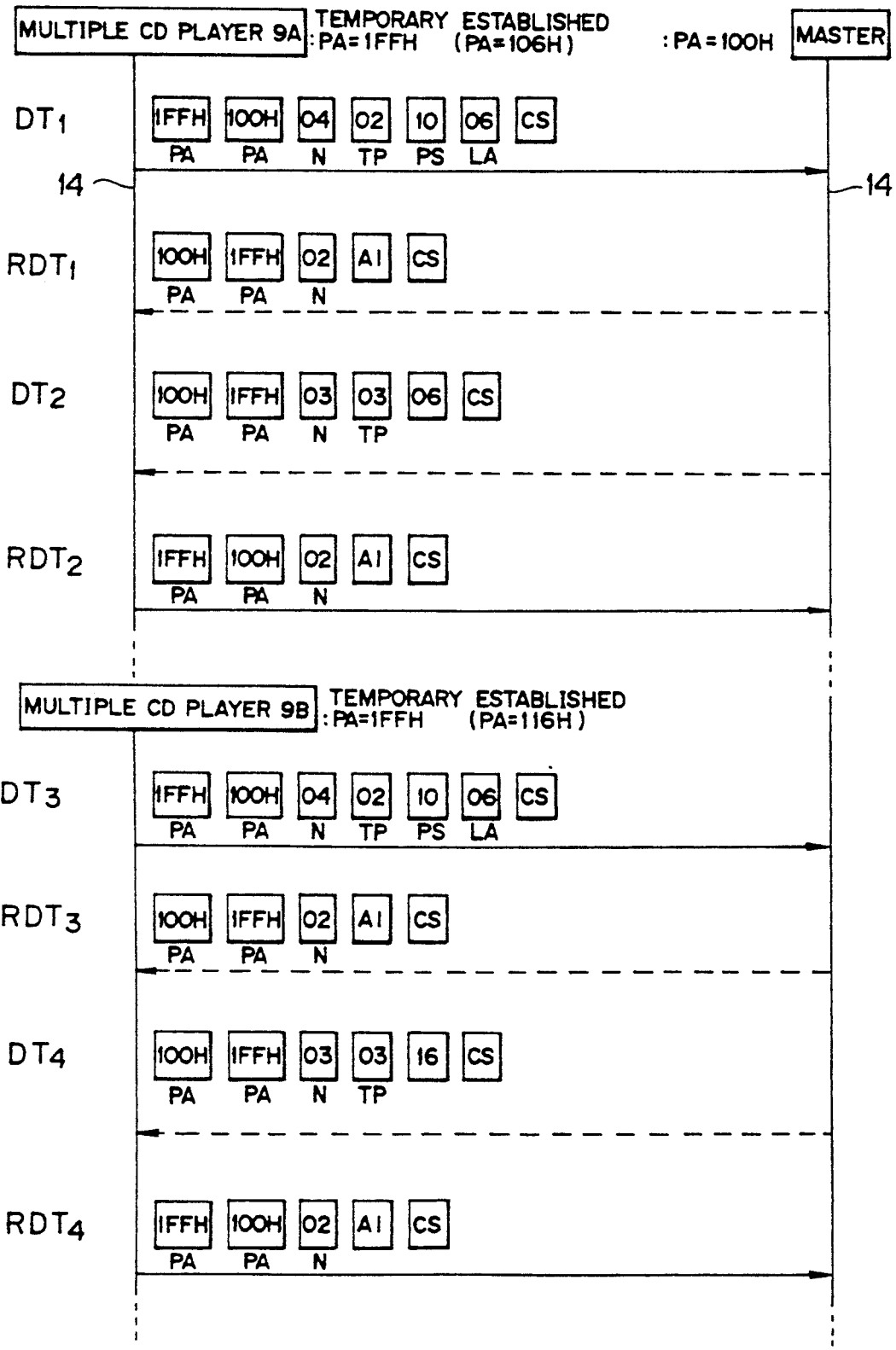
FIG. 38 is a diagram illustrative of a sequence of data communication in the data communication system according to the fourth embodiment.

FIG. 38 shows a specific communication sequence in which two slave units, e.g., the multiple CD players 9A, 9B, make a connection request to and access the master unit for established communication addresses when the audiovisual system starts to operate.

As shown in FIG. 38, the multiple CD player 9A issues and transmits communication data $DT_1$ through the communication bus 14 to the master unit for a connection request by way of a self report. The communication data $DT_1$ includes physical address data PA="1FFH" ("H" means the hexadecimal notation) of the slave unit as indicating a temporary communication address, physical address data PA="100H" of the master unit to which the communication data is to be transmitted, classification data TP="02H" indicating that the communication data is transmitted for a connection request using the temporary communication address, and logical address data LA="06H" indicating that the slave unit transmitting the communication data comprises a multiple CD player. The temporary communication address may be selected as desired. However, temporary communication addresses should desirably be grouped according to function, e.g., "1FFH" for audio components, "2FFH" for navigation components, "3FFH" for telephone components, and "4FFH" for facsimile components, so that temporary communication addresses can be set for respective groups.

Based on the transmitted communication data $DT_1$, the master unit recognizes that a slave unit having temporary physical address data PA="1FFH" and logical address data LA="06H", i.e., a slave unit functioning as a multiple CD player, is connected to the communication bus 14.

In response to the communication data $DT_1$, the master unit transmits return data RDT back to the slave unit, indicating that the master unit has received the communication data $DT_1$.

The master unit determines whether a slave unit functioning as a multiple CD player has previously been connected to the communication bus 14. Since a slave unit functioning as a multiple CD player has not previously been connected to the communication bus 14, the master unit sets and registers physical address data PA="106H" as an established communication address as indicating a first slave unit having a multiple CD player function. For example, the physical address data PA="106H" is a combination of four high-order bits "1H" of the temporary communication address "1FFH", data "0H" indicating the first slave unit whose communication request is first received by the master unit in the same kind of slave units, and four low-order bits "6H" of the logical address data LA="06H" which indicates the function of the slave unit.

Then, the master unit issues and transmits communication data DT, through the communication bus 14 to the slave unit in order to give the established communication address to the slave unit. The communication data DT, includes physical address data PA="100H" of the master unit, physical address data PA="1FFH", as indicating the temporary communication address, of the slave unit to which the communication data is to be transmitted, message length data N="03H" indicating that the number of data items to be transmitted is 3, classification data TP "03H" indicating the transmission of the established communication address, address data ADR="06H" indicating eight low-order bits of the established physical address data PA as representing the established communication address of the slave unit, and check sum data CS.

Subsequently, the master unit will handle the slave unit as an audiovisual system member.

In response to the communication data $DT_2$, the slave unit transmits return data $RDT_2$ back to the master unit, indicating that the slave unit has received the communication data $DT_2$.

Based on the communication data $DT_2$, the slave unit generates physical address data PA="106H" as indicating the established communication address, and will use the physical address data PA="106H" for subsequent communication.

The physical address data PA="106H" is a combination of four high-order bits "1H" of the temporary communication address "1FFH", and the address data ADR="06H".

The other slave unit, i.e., the multiple CD player 9B, issues communication data $DT_3$ for a connection request by way of a self report. However, the communication data $DT_3$ is not accepted by the master unit while the multiple CD player 9A is communicating with the master unit. After the communication between the multiple CD player 9A and the master unit is finished, the communication data DT$_3$ is transmitted through the communication bus 14 to the master unit. The communication data DT$_3$ includes physical address data PA="1FFH" of the slave unit as indicating a temporary communication address, physical address data PA="100H" of the master unit to which the communication data is to be transmitted, and logical address data LA="06H" indicating that the slave unit transmitting the communication data comprises a multiple CD player.

Based on the transmitted communication data DT$_3$, the master unit recognizes that a slave unit having temporary physical address data PA="1FFH" and logical address data LA="06H", i.e., a slave unit functioning as a multiple CD player, is connected to the communication bus 14.

In response to the communication data DT$_3$, the master unit transmits return data RDT$_3$ back to the slave unit, indicating that the master unit has received the communication data DT$_3$.

The master unit determines whether a slave unit functioning as a multiple CD player has previously been connected to the communication bus 14. Since the slave unit functioning as the multiple CD player 9A has already been connected to the communication bus 14, the master unit sets and registers physical address data PA="116H" as an established communication address as indicating a second slave unit having a multiple CD player function.

Then, the master unit issues and transmits communication data DT$_4$ through the communication bus 14 to the slave unit in order to give the established communication address to the slave unit. The communication data DT$_4$ includes physical address data PA="100H" of the master unit, physical address data PA="1FFH", as indicating the temporary communication address, of the slave unit to which the communication data is to be transmitted, message length data N="03H" indicating that the number of data items to be transmitted is 3, classification data TP "03H" indicating the transmission of the established communication address, address data ADR="16H" indicating eight low-order bits of the established physical address data PA as representing the established communication address of the slave unit, and check sum data CS.

Subsequently, the master unit will handle the slave unit as another audiovisual system member.

In response to the communication data DT$_4$, the slave unit transmits return data RDT$_4$ back to the master unit, indicating that the slave unit has received the communication data DT$_4$.

Based on the communication data DT$_4$, the slave unit generates physical address data PA="116H" as indicating the established communication address, and will use the physical address data PA="116H" for subsequent communication.

While only the communication sequences at the time the system starts to operate have been illustrated above, it is also possible to establish a communication address for a slave unit that is newly connected to an existing data communication system in the same manner as described above for establishing the communication address for the second slave unit.

In the case where the fourth embodiment is applied to the data communication system as shown in FIG. 20, the groups of slave units, e.g., the audiovisual, telephone, navigation, and FAX groups, are allotted respective temporary communication addresses, and the master units recognize the slave units to be controlled thereby in the respective groups based on the temporary communication addresses, and establish communication addresses for the slave units to be controlled. For example, the audiovisual group may be allotted a temporary communication address of "1FFH", and the navigation group may be allotted a temporary communication address of "3FFH".

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A data communication system for use on a motor vehicle, comprising:
   a communication bus;
   at least one master unit connected to said communication bus; and
   at least one slave unit connected to said communication bus;
   said master unit having connection request demand means for outputting connection request demand data to demand a request for a connection to the communication bus to said slave unit when the master unit is enabled;
   said slave unit having connection request means for transmitting its own connection request information to said master unit in response to said connection request demand data from the master unit if said connection request demand data is received by said slave unit, and for continually transmitting the connection request information to said master unit in each predetermined time period as long as said data communication system is energized if said connection request demand data is not received by said slave unit.

2. A data communication system according to claim 1, wherein said data communication system is energized by an ACC switch of said motor vehicle, and said connection request means continually transmits the connection request information to said master unit as long as the ACC switch is ON.

3. A data communication system according to claim 1, wherein said slave unit comprises operation mode changing means for controlling the slave unit to enter a low power consumption mode in the absence of a response from said master unit to the connection request information transmitted in each predetermined time period to said master unit.

4. A data communication system according to claim 3, wherein said operation mode changing means comprises means for controlling the slave unit to enter a normal operation mode in the presence of a response from said master unit to the connection request information transmitted in each predetermined time period to said master unit.

5. A data communication system according to claim 3, wherein said operation mode changing means comprises means for controlling the slave unit to enter a stop mode in the absence of a response from said master unit to the connection request information transmitted in each predetermined time period to said master unit.

6. A data communication system according to claim 1, wherein said slave unit comprises operation mode changing means for controlling the slave unit to enter a stop mode in the absence of a response from said master unit to the connection request information transmitted in each predetermined time period to said master unit.

7. A data communication system according to claim 6, wherein said operation mode changing means comprises means for controlling the slave unit to enter a normal operation mode in the presence of a response from said master unit to the connection request information transmitted in each predetermined time period to said master unit.

8. A data communication system according to claim 3, wherein said slave unit comprises:
   an interface connected to said communication bus for transmitting communication data to and receiving communication data from said master unit; and
   a controller for controlling the slave unit; and
   said controller including means for energizing said interface and halting said controller in said low power consumption mode.

9. A data communication system according to claim 8, wherein said interface includes a data receiver for receiving communication data, said controller including means for energizing only said data receiver in said low power consumption mode.

10. A data communication system according to claim 5, wherein said slave unit comprises:
    an interface connected to said communication bus for transmitting communication data to and receiving communication data from said master unit; and
    a controller for controlling the slave unit; and
    said controller including means for energizing said interface and stopping said controller in said stop mode.

11. A data communication system according to claim 10, wherein said interface includes a data receiver for receiving communication data, said controller including means for energizing only said data receiver in said stop mode.

12. A data communication system according to claim 3, wherein said connection request means continually transmits the connection request information to said master unit in each predetermined time period in said low power consumption mode.

13. A data communication system for use on a motor vehicle, comprising:
    a communication bus;
    at least one master unit connected to said communication bus; and
    a plurality of slave units connected to said communication bus;
    each of said slave units transmitting connection information thereof to said master unit, and comprising:
      first memory means for storing present connection information thereof; and
      first connection information transmitting means for transmitting, to said master unit, first change information indicating whether said present connection information stored in said first memory means and previous connection information of the slave unit that has been transmitted to said master unit prior to said present connection information are identical to each other or not;
    said master unit comprising:
      second memory means for storing connection information thereof; and
      second connection information transmitting means for transmitting the connection information stored in said second memory means to said slave units based on the first change information of each of said slave units.

14. A data communication system according to claim 13, wherein said first connection information transmitting means comprises means for transmitting said first change information and said present connection information stored in said first memory means to said master unit if said present connection information of the slave unit and said previous connection information thereof that has previously been transmitted to said master unit are not identical to each other.

15. A data communication system according to claim 13, wherein said second connection information transmitting means comprises means for transmitting, to said slave units, second change information indicating whether present connection information stored in said second memory means and previous connection information of said second memory that has been transmitted to said slave units prior to said present connection information in said second memory means are identical to each other or not.

16. A data communication system according to claim 15, wherein said master unit further comprises means for transmitting, to said slave units, at least one of the connection information stored in said second memory means and connection information of the slave units which are connected to said communication bus.

17. A data communication system according to claim 13, wherein said second connection information transmitting means comprises means for transmitting the connection information stored in said second memory means to said slave units when the number or types of the slave units connected to said communication bus are changed.

18. A data communication system according to claim 15, wherein said second connection information transmitting means comprises means for transmitting said present connection information of said second memory and said second change information, simultaneously to said slave units connected to said communication bus.

19. A data communication system according to claim 15, wherein said second connection information transmitting means comprises means for transmitting said present connection information of said second memory and said second change information, to a predetermined group of slave units included in said slave units connected to said communication bus.

20. A data communication system according to claim 13, wherein said first connection information transmitting means comprises means for transmitting at least said first change information in each predetermined time period.

21. A data communication system according to claim 15, wherein said second connection information transmitting means comprises means for transmitting at least said second change information in each predetermined time period.

22. A data communication system for use on a motor vehicle, comprising:
    a communication bus;
    at least one master unit connected to said communication bus; and a plurality of slave units connected to said communication bus;

each of said slave units comprising:
  memory means for storing a communication address thereof updatably; and
  connection request means for transmitting connection request information thereof to said master unit when the data communication system starts to operate;

said master unit comprising communication address setting means for establishing a communication address of each of the slave units different from those of the other slave units and transmitting the established communication address to the slave unit when the connection request information is received.

23. A data communication system according to claim 22, wherein said memory means of each of said slave units comprises means for storing a temporary communication address before the data communication system starts to operate.

24. A data communication system according to claim 23, wherein said memory means of each of said slave units comprises means for storing a common temporary communicating address for a predetermined group of slave units included in said slave units connected to said communication bus.

25. A data communication system according to claim 23, wherein said communication address setting means comprises means for establishing the communication address based on the temporary communication address.

* * * * *